(12) United States Patent
Durantay et al.

(10) Patent No.: US 12,413,127 B2
(45) Date of Patent: Sep. 9, 2025

(54) ELECTRIC STABILISERS

(71) Applicant: GE ENERGY POWER CONVERSION TECHNOLOGY LIMITED, Warwicksire (GB)

(72) Inventors: Lionel Durantay, Champigneulles (FR); Christophe Grosselin, Champigneulles (FR); Alfred Permuy, Villebon-Sur-Yvette (FR); Kevin Schmisser, Champigneulles (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 223 days.

(21) Appl. No.: 18/336,751

(22) Filed: Jun. 16, 2023

(65) Prior Publication Data

US 2023/0412059 A1    Dec. 21, 2023

(51) Int. Cl.
  *H02K 41/02*    (2006.01)
  *B63B 39/00*    (2006.01)
  *H02K 7/09*    (2006.01)

(52) U.S. Cl.
  CPC ............. *H02K 41/02* (2013.01); *B63B 39/00* (2013.01); *H02K 7/09* (2013.01)

(58) Field of Classification Search
  CPC ...... H02K 41/02; H02K 7/09; H02K 2213/12; H02K 41/031; H02K 1/06; H02K 3/48;
  (Continued)

(56) References Cited

U.S. PATENT DOCUMENTS

| 3,397,664 | A |   | 8/1968 | Slager et al. |
| 4,768,357 | A | * | 9/1988 | Ohtake .................. D04B 1/104 66/126 R |

(Continued)

FOREIGN PATENT DOCUMENTS

| EP | 0607648 A1 |   | 7/1994 |
| JP | 2017030589 | * | 2/2017 |

(Continued)

OTHER PUBLICATIONS

Haro et al. "Ship's roll stabilization by anti-roll active tanks," Oceans 2011 IEEE—Spain, Santander, Spain, 2011, pp. 1-10, doi: 10.1109/Oceans-Spain.2011.6003385. (English Abstract Only).

(Continued)

*Primary Examiner* — Ahmed Elnakib

(57) ABSTRACT

Provided is an electric stabiliser for stabilising a floating structure that includes a track for guiding a mover as a moving stabiliser mass. A direct current (DC) linear motor includes a planar stator that extends along the track and the mover that is adapted to move forwards and backwards along the track as the stabiliser mass. The planar stator includes a polyphase stator winding with winding coils connected. The mover includes permanent motor magnets facing the polyphase stator winding that define mover poles of alternating polarity along the track direction. Two active magnetic bearings is positioned between the track and a main body of the mover for selectively levitating the mover. In use, the active magnetic bearings levitate the mover above the track and the DC linear motor is controlled to move the mover backwards and forwards along the track to dampen a rolling/pitching movement of the floating structure.

15 Claims, 31 Drawing Sheets

(58) Field of Classification Search
CPC .. H02K 41/0356; H02K 41/03; H02K 41/035; B63B 39/00; B63B 39/02; B63B 43/08; F16C 7/06; F16C 2202/40; F16C 32/0465; F16C 2326/30; F16C 32/0472; H02P 25/064; H02N 15/00
USPC .................................................. 310/90.5, 12.4
See application file for complete search history.

(56) References Cited

U.S. PATENT DOCUMENTS

| | | | |
|---|---|---|---|
| 6,019,056 | A | 2/2000 | Maeda et al. |
| 6,777,833 | B1 | 8/2004 | Williams |
| 6,973,847 | B2 | 12/2005 | Adams et al. |
| 7,458,329 | B2 | 12/2008 | Nedwed |
| 8,020,494 | B2 | 9/2011 | Smith et al. |
| 2003/0102723 | A1* | 6/2003 | Korenaga ............ G03F 7/70758 310/12.24 |
| 2018/0350648 | A1* | 12/2018 | Klesen .............. H01L 21/67715 |

FOREIGN PATENT DOCUMENTS

| | | |
|---|---|---|
| JP | 2017030589 A | 2/2017 |
| KR | 20200120060 A | 10/2020 |
| WO | 2010143085 A2 | 12/2010 |
| WO | 2020057739 A1 | 3/2020 |

OTHER PUBLICATIONS

Kummer et al. "Compensation de Gîte Du Porte-Avions Charles de Gaullel: Principes et Structure Des Lois de Commande." Bulletin de l'Association Technique Maritime et Aéronautique, Jan. 2000. (English Abstract Only).
European Extended Search Report for EP Application No. 22275081.2 dated Dec. 22, 2022, 11 pages.
Sinha "Different Types of Roll Stabilization Systems Used for Ships." Marine Insight, Apr. 17, 2022. https://www.marineinsight.com/naval-architecture/roll-stabilization-systems/.
Steinmann "White Paper 1403: How Gyros Create Stabilizing Torque." Veem Marine | Boat Gyro stabilizer manufacturers, 2014. http://veemmarine.com/wp-content/uploads/2015/11/White_Paper_1403-How_Gyros_Create_Stabilizing-Torque.pdf.

* cited by examiner

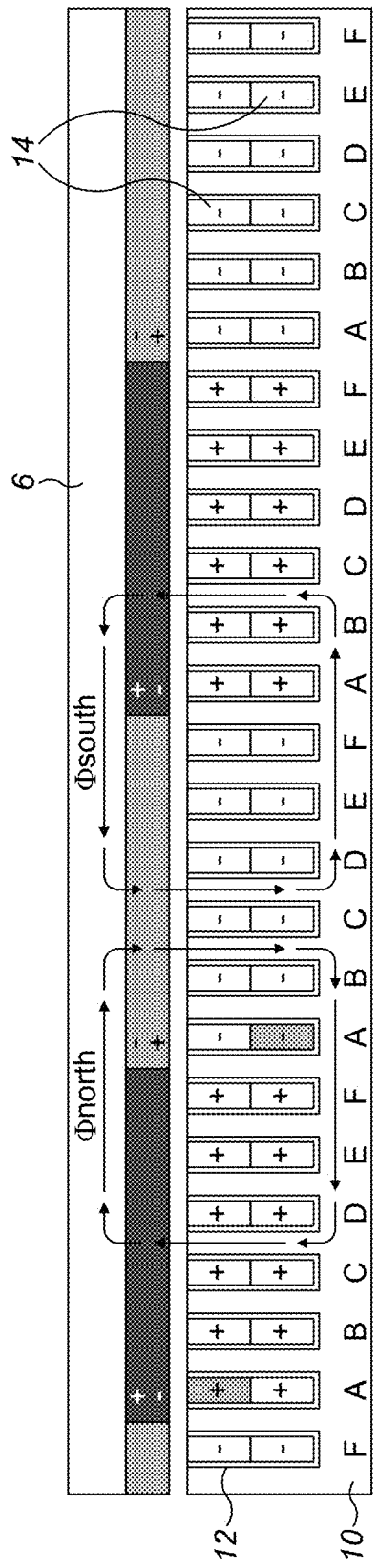
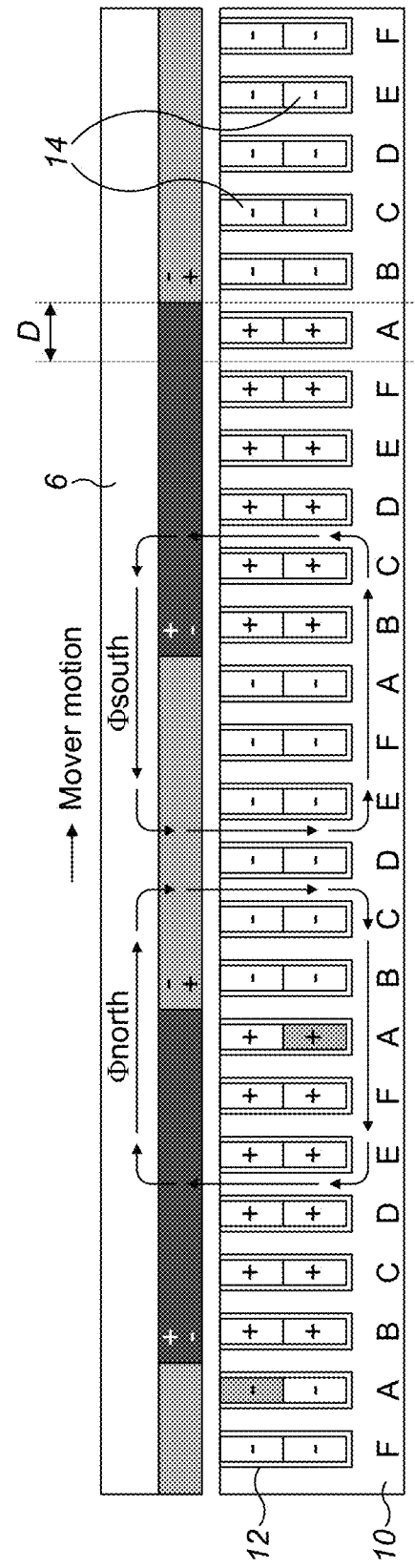
FIG. 9A
FIG. 9B

ELECTRIC STABILISERS

CROSS-REFERENCE TO RELATED APPLICATIONS

This application claims priority to European Patent Application Serial Number 22275081.2, filed Jun. 17, 2022, which is herein incorporated by reference.

TECHNICAL FIELD

The present invention relates to electric stabilisers, and in particular to electric stabilisers for stabilising a floating structure.

The term "floating structure" is intended to cover any structure that floats and that requires stabilising in use such as inter alia civilian or military marine vessels, floating platforms or oil storage facilities, and off-shore wind turbines.

BACKGROUND OF THE INVENTION

On floating structures such as marine vessels, stabilisers can be used to reduce pitch and/or roll in rough seas and help maintain speeds while reducing fuel consumption. (As used herein, "pitch" refers to the up-and-down movement of the bow and stern of the marine vessel, or rotation about its transverse or port-starboard axis, and "roll" refers to the side-to-side movement of the marine vessel, or rotation about its longitudinal or bow-stern axis. In more general terms, "pitch" and "roll" may refer to rotation about any two perpendicular axes of the floating structure.)

Known stabilisers for marine vessels and other floating structures include passive and active ballasts, passive bilge keels, active fins, active gyroscopes, mechanical linear systems, optionally including electric dampers, and moving mass systems.

SUMMARY OF THE INVENTION

The present invention provides an "all-electric" stabiliser that can be used to stabilise a floating structure. The electric stabiliser comprises:
 a track for guiding a moving stabiliser mass along a track direction;
 a direct current (DC) linear motor comprising a planar stator that extends along the track (i.e., in the track direction), and a mover that is adapted to move forwards and backwards along the track as the stabiliser mass, wherein the stator comprises a polyphase stator winding and the mover comprises a plurality of permanent motor magnets facing the polyphase stator winding that define a plurality of mover poles of alternating polarity (i.e., north and south polarity) along the track direction; and
 at least one active magnetic bearing for selectively levitating the mover.

The track can be substantially U-shaped and have a base and a pair of opposing sides that define a channel in which the mover is positioned. Suitable materials for the track might include steel, cast iron, electrical steel laminations, for example. Both sides of the mover can further comprise one or more guide members (e.g., pads or rollers) adapted to contact the facing side of the track to guide and locate the mover as it moves forwards and backwards along the track.

Depending on operational requirements, in a practical arrangement the track can have a width of about 1 m to about 20 m and a length of about 5 m to about 100 m. The sides of the track can have a height of about 0.4 m to about 2 m.

The DC linear motor can further comprise one or more additional planar stators, each additional planar stator comprising a polyphase stator winding. The mover can further comprise one or more additional plurality of permanent motor magnets that define an additional plurality of mover poles of alternating polarity along the track direction. Each additional plurality of permanent motor magnets faces a respective polyphase stator winding. Each planar stator and corresponding facing plurality of permanent motor magnets on the mover can be considered as being a functional part of the DC linear motor and the planar stators are operated and controlled together to move the mover forwards and backwards along the track.

Each planar stator can be mounted on or form part of the track. Each planar stator can have a modular construction— i.e., it can be constructed from a plurality of modules or units that are assembled together along the track and connected together by any suitable means. Each planar stator can comprise a plurality of winding slots spaced apart along the track (i.e., in the track direction) for receiving the winding coils of the respective polyphase stator winding. The winding slots can be formed in a magnetically permeable part of each planar stator. Each planar stator can comprise a plurality of thin sheets or laminations, separated by electrically insulating layers, stacked across the track in a transverse direction to minimise eddy current losses. In one arrangement, the thin sheets or laminations can be electrically insulated from each other by a thin coating of insulating varnish or an oxide layer, for example.

Each polyphase stator winding can have any suitable number of phase windings. Each phase winding defines a phase of the polyphase stator winding and comprises one or more winding coils that are received in the winding slots. Busbars or cables for interconnecting the winding coils of each phase winding can run alongside each planar stator. The winding coils can be single-layer or two-layer (or double-layer) coils, for example. Each winding coil will include a pair of winding runs. The winding runs of each winding coil are received in a corresponding pair of winding slots. In the case of single-layer winding coils, it means that each winding slot in the planar stator will receive the winding run of a single winding coil. In the case of two-layer winding coils, it means that each winding slot in the planar stator will receive the winding run of a pair of winding coils, with the winding runs typically being positioned on top of each other. In one arrangement, where each planar stator has a modular construction and is formed from a plurality of modules or units that are assembled together along the track, one of the winding runs of a particular winding coil might be received in a winding slot of one module or unit and the other winding run might be received in a winding slot of an adjacent module or unit of the planar stator. Put another way, one or more of the winding coils might span two adjacent modules or units of the planar stator.

If each polyphase stator winding is designed to operate normally with n phase windings, the stator winding, and its associated power converter system, can be adapted to operate safely with fewer phase windings—e.g., with (n−1) or (n−2) phase windings. This provides improved redundancy in the event of a fault in one or more of the phase windings. More particularly, it means that a faulty phase winding can be isolated, and the electric stabiliser can continue to operate without any significant impact on safety and performance until the faulty phase winding is repaired. In one arrangement, each polyphase stator winding can comprise six phase windings and can be adapted to operate with five (or fewer) phase windings during a fault condition. But it will be readily understood that each polyphase stator winding can have any suitable number of phase windings depending on design and performance requirements.

The mover can be selectively driven forwards or backwards along the track by the bidirectional linear driving force (or "thrust") that is generated by the interaction between the magnetic field generated by the switched DC current in each polyphase stator winding and the magnetic field generated by the facing plurality of permanent motor magnets on the mover. The switched DC current in the linear motor can be controlled by a suitable controller. In particular, the controller can control the supply of electrical power to the phase windings of each polyphase stator winding (i.e., it can control commutation) in order to move the mover forwards or backwards along the track, typically with a positioning accuracy that corresponds to the slot pitch of the planar stator.

Each polyphase stator winding can be electrically connected to a suitable power converter system that can be controlled by the controller.

In one arrangement, each phase winding of the polyphase stator winding can be connected to a respective converter unit of the power converter system. The converter units can be electrically connectable in parallel to at least one power supply, optionally by means of an interposing switch or breaker. Each converter unit can be electrically connected to one of the busbars or cables mentioned above for interconnecting the winding coils of each phase winding. Electrically connecting the converter units to two or more power supplies provides improved redundancy in the event of a fault in one of the power supplies. Each power supply can be part of a power supply for the floating structure, e.g., the marine vessel power distribution network, or a separate power supply for the electric stabiliser. Any suitable converter units can be used having any suitable topology. In one arrangement, each converter unit can comprise an AC/DC converter with AC input terminals connectable to at least one AC power supply, and DC output terminals connected to the respective phase winding of the polyphase stator winding. In another arrangement, each converter unit can comprise a DC/DC converter with DC input terminals connectable to at least one DC power supply, and DC output terminals connected to the respective phase winding of the polyphase stator winding.

In another arrangement, each phase winding (or each individual winding coil) of the polyphase stator winding can be electrically connected to a power electronic switching module and connected to adjacent phase windings (or winding coils) through DC terminals of the switching module. Groups of switching modules can be electrically connected together in series between DC load terminals to define a plurality of parallel DC circuits. The DC load terminals can be electrically connectable to at least one power supply. Each switching module can include an H-bridge with DC input terminals and AC output terminals. The AC output terminals are connected to the terminals of the corresponding phase winding (or individual winding coil) and the DC input terminals of a plurality of H-bridges are connected together in series to define a DC circuit. Each H-bridge can include four semiconductor switching devices arranged in a conventional manner. Any suitable semiconductor switching devices can be used, including thyristors and devices that can be turned on and off by gate control. Gate drive signals can be provided to each switching module from an associated controller. The switching modules form a power converter system where each phase winding (or winding coil) can be selectively connected to the DC load terminals through its switching module in order to move the mover forwards or backwards along the track. The switching modules can be mounted next to each planar stator where they can be easily connected to the respective winding coils.

A main body of the mover can comprise a block of material with a mass that is sufficient to function as a stabiliser mass for the floating structure. In a practical arrangement, the mass of the main body can be in the range of about 100 kg to about 250 metric tonnes depending on operational requirements. Suitable materials for the main body might include steel, cast iron, electrical steel laminations, for example.

The mover has a longitudinal axis that is substantially aligned with the direction along which it moves forwards and backwards along the track (i.e., the track direction). It will be readily understood that the longitudinal axis can be straight or curved, e.g., if the mover is shaped to travel along a circular track. In this case, the sides of the mover will normally be curved. The mover has a transverse axis that is substantially aligned with the direction across the track. For any given mass, the dimensions of the mover can be determined by the size of the volume that is available to accommodate the electric stabiliser. For example, if there is a limit on the overall height of the electric stabiliser, it may be necessary to increase the length of the mover, i.e., its dimension in the longitudinal direction. In a practical arrangement, the mover can have a length of about 1 m to about 50 m and a height of about 0.3 m to about 2 m. In a practical arrangement, the mover can have a width, i.e., its dimension in the transverse direction, of about 1 m to about 20 m to fit within the track channel.

The mover can comprise one or more mounts for mounting or securing the permanent motor magnets ("motor mounts"). In particular, the mover can comprise a first motor mount for mounting a first plurality of permanent motor magnets facing a first planar stator, a second motor mount for mounting a second plurality of permanent motor magnet facing a second planar stator etc. Each motor mount can extend along the longitudinal axis of the mover. Each motor mount can comprise a plurality of thin sheets or laminations of magnetically permeable (preferably ferromagnetic) material, separated by electrically insulating layers, stacked to minimise eddy current losses to define a planar mounting structure with a mounting surface on which the permanent motor magnets are mounted or secured by any suitable means. Each motor mount can be located in a recess in a surface of the mover that faces the planar stator, e.g., in an upper, lower or side surface of the main body of the mover. The permanent motor magnets can also be located in the recess, mounted on the mounting surface, and are optionally substantially flush with the mover surface.

The mover can include one or more stiffening members for increasing the rigidity of the mover. Each stiffening member can be designed to reduce bending when the mover is levitated above the track base. In one arrangement, each stiffening member can extend substantially along the transverse axis of the mover. Each stiffening member can be formed as a flange or rib on the upper surface of the mover, for example.

Each planar stator of the DC linear motor can be positioned below the mover, above the mover, or alongside the mover. It will be readily understood that the linear motor can include any suitable number of planar stators, which can be arranged in different ways depending on the size of the volume that is available to accommodate the electric stabiliser and on its operational requirements. The planar stators can also be arranged deliberately to reduce bending when the mover is levitated. For example, one or more planar stators can be positioned:

below the mover, e.g., on the base of the track, with facing permanent motor magnets being provided on a lower part of the mover, and/or above the mover with facing permanent motor magnets being provided on an upper part of the mover, and/or alongside the mover, e.g., on the sides of the track, with facing permanent motor magnets being provided on a side part of the mover.

If a plurality of planar stators are provided, they can be spaced across the base and/or the sides of the track and/or spaced across a supporting structure above the mover. Such a supporting structure can be part of the electric stabiliser or part of the floating structure, for example.

The electric stabiliser can include any suitable number of active magnetic bearings. Each active magnetic bearing is preferably positioned between the track and part of the main body of the mover, e.g., between the track base and a lower part of the mover.

Each active magnetic bearing can comprise a pair of electromagnets and a plurality of permanent bearing magnets facing each electromagnet. It will be readily understood that conventional active magnetic bearings are normally designed to generate an attractive magnetic force that "pulls" the supported structure (e.g., a rotating shaft) towards the electromagnets. Pairs of conventional active magnetic bearings are therefore arranged opposite each other and adjusted to pull against each other to main proper positioning or alignment of the supported structure. In the present invention, for each active magnetic bearing, the facing permanent bearing magnets on the mover generate an additional magnetic field that interacts with the magnetic field generated by the pair of electromagnets when they are supplied with electrical power. The interaction generates an upwardly acting repulsive magnetic force that "pushes" the permanent bearing magnets on the mover away from the electromagnets. It therefore follows that the mover is "pushed" upwards away from the track by the repulsive magnetic force.

The addition of the permanent bearing magnets means that the mover can be selectively levitated without the need for one or more active magnetic bearings to be positioned above the mover to "pull" the mover upwards away from the track. It also means that the airgap between the facing surfaces of the electromagnets and the permanent bearing magnets when the mover is levitated can be significantly increased to between about 2 mm and about 10 mm in a practical arrangement. Even if the mover bends slightly during levitation, the increased airgap can ensure that there is no physical contact between the lower part of the mover and the rest of the electric stabiliser that might impede movement of the mover along the track.

The plurality of permanent bearing magnets is formed on the mover, and in particular on a lower part of the mover.

Each electromagnet can be mounted on or form part of the track. If a plurality of active magnetic bearings are provided, pairs of electromagnets can be spaced across the base of the track. Each electromagnet can have a modular construction—i.e., it can be constructed from a plurality of modules or units that are assembled together along the track. Each electromagnet can include one or more coils formed on a magnetic core, which can comprise a plurality of thin sheets or laminations of magnetically permeable (preferably ferromagnetic) material, separated by electrically insulating layers, stacked along the track to minimise eddy current losses. For each pair of electromagnets to generate the magnetic field, current is supplied to the coil of one of the pair of electromagnets in a first direction to define a first electromagnet pole of first polarity (e.g., north polarity) and to the coil of the other of the pair of electromagnets in a second and opposite direction to define a second electromagnet pole of second and opposite polarity (e.g., south polarity). Each active magnetic bearing can comprise two or more pairs of electromagnets.

Facing each pair of electromagnets, the lower part of the mover can comprise a first plurality of permanent bearing magnets defining a first bearing pole of first polarity (e.g., north polarity) extending along the longitudinal axis of the mover and a second plurality of permanent bearing magnets defining a second bearing pole of second and opposite polarity (e.g., south polarity) extending along the longitudinal axis of the mover. The first and second plurality of permanent bearing magnets are arranged side by side and can be spaced apart along a transverse axis of the mover. The first plurality of permanent bearing magnets can be arranged opposite one of the pair of electromagnets and the second plurality of permanent bearing magnets can be arranged opposite the other of the pair of electromagnets.

The mover can comprise one or more mounts for mounting or securing the permanent bearing magnets ("bearing mounts"). Each bearing mount can extend along the longitudinal axis of the mover. Each bearing mount can comprise a plurality of thin sheets or laminations of magnetically permeable (preferably ferromagnetic) material, separated by electrically insulating layers, stacked along the longitudinal axis of the mover to minimise eddy current losses to define a planar mounting structure with a mounting surface on which permanent bearing magnets are mounted or secured by any suitable means. Each bearing mount can be located in a recess in the lower surface of the mover that faces the respective electromagnet, e.g., in the lower surface of the main body of the mover. The permanent bearing magnets can also be located in the respective recess, mounted on the respective mounting surface, and are optionally substantially flush with the mover surface.

The magnetic field generated by each first and second plurality of permanent bearing magnets generates a downwardly acting attractive magnetic force that "pulls" the permanent bearing magnets towards the magnetic core of the facing pair of electromagnets.

In one arrangement, the mover can comprise one or more non-magnetic feet adapted to contact the track when the mover is not levitated by the at least one active magnetic bearing. When the one or more feet are in physical contact with the track, there is preferably no physical contact between the mover and the planar stators or between the mover and the electromagnets.

Each foot can be formed as a downwardly extending protrusion. Each foot can extend along the longitudinal axis of the mover, like a longitudinal rib, and can be formed on a lower part of the mover, e.g., on the main body of the mover. The mover can comprise a plurality of feet spaced apart along a transverse axis of the mover. Preferably at least a pair of feet are provided—one foot being located near each side of the mover.

The one or more feet can be sized and shaped so that they do not carry any significant magnetic flux when they are in physical contact with the track. The magnetic fields generated by the permanent motor magnets or permanent bearing magnets are preferably confined to the planar stator and the magnetic cores of the electromagnets. This prevents any magnetic attraction between the feet and the track. If such magnetic attraction is not actively prevented, it might cause damage to the track surface as a result of the mover being repeatedly levitated.

Suitable non-magnetic materials for the one or more feet might include stainless steel, for example.

An alternative to providing non-magnetic feet on the mover would be to provide one or more non-magnetic supports on the track, for example, which contact the mover when the mover is not levitated by the at least one active magnetic bearing. Each support can be formed as an upwardly extending protrusion. Each support can be formed on the base of the track and can extend along the track. The track can include a plurality of supports spaced apart across the base of the track. In the same way as the non-magnetic feet, the one or more supports can be sized and shaped so that they do not carry any significant magnetic flux when they are in physical contact with the lower part of the mover.

The electric stabiliser can be operated in two operating states, namely an off-state where the mover is not levitated by the one or more active magnetic bearings, i.e., when no or insufficient electrical power is supplied to the one or more electromagnets, and an on-state where the mover is levitated above the track base by the one or more active magnetic bearings, i.e., when sufficient electrical power is supplied to the one or more electromagnets.

In the off-state, the mover is stationary and its one or more non-magnetic feet, if provided, are in physical contact with the track.

If it is necessary to move the mover along the track, in response to a rolling or pitching movement of the floating structure, for example, electrical power is supplied to the electromagnets to transition the electric stabiliser to the on-state. The mover will levitate if the total upwardly acting repulsive magnetic force generated by the interaction between the magnetic fields generated by the permanent bearing magnets and the electromagnets is equal to the total weight of the mover plus the total of any downwardly acting forces such as the attractive magnetic force between a planar stator positioned below the mover and the respective facing permanent motor magnets on the lower part of the mover, and between the permanent bearing magnets and the magnetic cores of the facing electromagnets, for example. In some arrangements, any downwardly acting attractive magnetic force between the planar stator and the permanent motor magnets might be reduced or substantially cancelled by positioning one or more planar stators above the mover to provide a corresponding upwardly acting attractive magnetic force, or by only positioning one or more planar stators at the side of the mover, for example. Such arrangement can also help to reduce bending of the mover when it is levitated.

Each active magnetic bearing can be controlled by a suitable control loop to continuously adjust the electrical power supplied to one or more of the electromagnets to provide stable levitation, both when the mover is stationary and when it is being driven forwards or backwards along the track. In particular, the supply of electrical power to each electromagnet can be controlled by a suitable controller.

In the on-state, the one or more non-magnetic feet of the mover, if provided, are not in contact with the track and the levitated mover can be held stationary above the track or can be driven forwards or backwards along the track by the DC linear motor. If the track is inclined, because of the rolling or pitching movement of the floating structure, for example, the linear motor can be used to hold the mover stationary above the track preparatory to being moved. The switched DC current in the linear motor can be controlled by the controller to move the mover forwards or backwards along the track. When the mover has been moved the necessary distance along the track, to dampen the rolling or pitching movement of the floating structure, the linear motor can be used to hold the mover stationary and the electric stabiliser is transitioned to the off-state by ending the supply of electrical power to the electromagnets. The distance that the mover needs to be moved along the track to counter the rolling or pitching movement depends on the mass of the mover.

As soon as the electric stabiliser is transitioned to the off-state, the stationary mover will be brought directly into physical contact with the track by the downwardly acting forces, including the total weight of the mover and the attractive magnetic forces mentioned above which "pull" the mover down towards the track. The friction contact between the one or more non-magnetic feet and the track (or between the one or more non-magnetic supports and the lower part of the mover) is sufficient to maintain the mover in a fixed and stationary position on the track without the need for hydraulic or mechanical brakes. An advantage is that the mover will also be brought directly into physical contact with the track, and maintained in a fixed and stationary position, if there is a fault which disrupts the supply of electrical power to the electromagnets, for example. This provides a "fail safe" state for the mover in case of a fault that prevents continued levitation of the mover for any reason.

The main body of the mover can have an integral or single-piece construction. However, limited access can sometimes prevent a physically large main body having an integral or single-piece construction from being easily installed in the floating structure.

In one arrangement, the mover can be formed from a plurality of individual modules or units that are connected together. Such a mover can have an articulated construction—i.e., where the modules or units can move or pivot relative to each other. Each module or unit can include a main body. Facing each planar stator, each module or unit can include one or more permanent motor magnets defining a mover pole having a particular polarity (e.g., north polarity or south polarity). The individual modules or units are then connected together so as to define mover poles of alternating polarity along the track direction. In other words, the one or more permanent motor magnets on a first module or unit can define a mover pole having a first polarity (e.g., north polarity). The first module or unit can be connected to a second module or unit whose one or more permanent motor magnets define a mover pole having a second and opposite polarity (e.g., south polarity). The second module or unit can be connected to a third module or unit whose one or more permanent motor magnets define a mover pole having the first polarity, and so on. In another arrangement, each module or unit can include a plurality of permanent magnets that define two or more mover poles of alternating polarity—e.g., a mover pole having a first polarity (e.g., north polarity) and a mover pole having a second and opposite polarity (e.g., south polarity). Each module or unit can also include one or more permanent bearing magnets. When the modules or units are connected together, the one or more permanent bearing magnets on each module or unit will define bearing poles as described above.

Each module or unit can also include one or more non-magnetic feet as described above. The feet can be spaced apart along the main body of each module or unit.

The individual modules or units of the articulated mover can be connected together by connecting rods. Each connecting rod can be pivotally connected to a pair of adjacent modules or units in such a way as to permit the adjacent modules or units to move or pivot relative to each other. The length of each connecting rod can be adjusted so as to adjust the lateral spacing between the pair of adjacent modules or units. Each pair of adjacent modules or units can be spaced apart to permit relative movement, for example as the mover moves forwards or backwards along the track. A flexible insulating member can be positioned between each adjacent pair of modules or units as long as it does not prevent them from being able to move or pivot relative to each other.

The mover can therefore be formed from any suitable number of modules or units. Each module or unit can have substantially the same construction. If manufactured as "standard" modules or units, movers of different lengths can be constructed by selecting the required number of modules or units and connecting them together as described above. Each additional module or unit will increase the mass of the mover. This allows movers of different mass to be constructed from a plurality of "standard" modules or units for use with a "standard" width track.

The track can be substantially straight or curved in the horizontal plane ("horizontal track layout"). The curved track can be substantially circular. If the track is curved, it will be understood that the mover will also be shaped to allow it to move along the track and it may have sides that are curved and not straight. If the curved track is substantially circular, driving the mover forwards along the track can correspond to driving the mover in a clockwise direction and driving the mover backwards along the track can correspond to driving the mover in an anti-clockwise direction, for example.

The track can be substantially flat or angled or curved in the vertical plane ("vertical track layout").

The electric stabiliser can be used to dampen rotation about an axis of the floating structure. To do so, the track of the electric stabiliser is typically arranged substantially perpendicular to the axis.

Two electric stabilisers can be used in combination to dampen rotation about the same axis of the floating structure if they are arranged substantially in parallel, or to dampen rotation about two perpendicular axes if they are arranged substantially perpendicular to each other.

For example, in the particular case of a marine vessel, the electric stabiliser can be used as an anti-roll stabiliser or as an anti-pitch stabiliser. For an anti-roll stabiliser, the track will be oriented substantially along the transverse or port-starboard axis of the marine vessel so that movement of the mover along the track can be used to dampen rotation of the marine vessel about the longitudinal or bow-stern axis. In the case of an anti-pitch stabiliser, the track will be oriented substantially along the longitudinal or bow-stern axis of the marine vessel so that movement of the mover along the track can be used to dampen rotation of the marine vessel about the transverse or port-starboard axis. A pair of electric stabilisers can be used in combination to dampen rotation about both the longitudinal and transverse axes of the marine vessel if they are arranged with their tracks substantially perpendicular to each other.

Compared to known stabilisers, the electric stabiliser of the present invention generates low levels of noise and vibration during operation. The electric stabiliser can also cope with rapid and fairly continuous movement of the mover (i.e., the stabiliser mass) forwards and backwards along the track, for example, if the floating structure is experiencing constant roll or pitching movement that requires constant dampening. There is no risk of overheating or mechanical wear and so the electric stabiliser has minimal maintenance requirements. In the particular case of a marine vessel, the electric stabiliser is capable of providing roll reduction greater than 90%. It is effective at low vessel speeds and for fast transient rolling. The electric stabiliser is preferably mounted within the hull of the marine vessel, and it does not increase total vessel water resistance. The electric stabiliser can be used in physically large civilian and military marine vessels, such as cruise liners and aircraft carriers, for example.

In the electric stabiliser described above, the DC linear motor is a synchronous motor. The present invention may further provide an alternative electric stabiliser where the DC linear motor is an induction (or asynchronous) motor, for example having a "squirrel-cage" construction. Such an asynchronous linear motor might be suitable if the electric stabiliser does not require high positioning accuracy and/or if the mover can be operated with an acceleration that is greater than about 10 m/s$^2$ with only limited short backward and forward movement along the track, for example.

The present invention provides an alternative "all-electric" stabiliser that can be used to stabilise a floating structure. The alternative electric stabiliser comprises:

a track for guiding a moving stabiliser mass along a track direction;

a DC linear motor comprising a planar stator that extends along the track, and a mover that is adapted to move forwards and backwards along the track as the stabiliser mass, wherein the stator comprises a polyphase stator winding and the mover comprises a pair of electrically conductive short-circuit bars extending along the track direction and a plurality of electrically conductive conducting bars facing the polyphase stator winding, the conducting bars extending between the pair of short-circuit bars and spaced apart along the track direction to define a squirrel-cage construction; and at least one active magnetic bearing for selectively levitating the mover.

The short-circuit bars can be spaced apart in the transverse direction (i.e., along the transverse axis of the mover) or spaced apart in the vertical direction (i.e., along a vertical axis of the mover) if they are provided at a side part of the mover.

The conducting bars can be received in slots or openings formed in a part of the mover that faces the stator, e.g., in an upper, lower or side part of the main body of the mover. The conducting bars can be received in a mount or core that comprises a plurality of thin sheets or laminations of magnetically permeable (preferably ferromagnetic material) separated by electrically insulating layers, stacked to minimise eddy current losses. The mount can comprise part of the main body of the mover. The conducting bars can be at least partially exposed at a surface of the mount, i.e., a surface that faces the planar stator.

The short-circuit bars and the conducting bars can be formed from any suitable material, such as aluminium or copper, for example.

If the mover has an articulated construction where the mover is formed from a plurality of individual modules or units that are connected together and can move or pivot relative to each other, each short-circuit bar can be formed in a plurality of separate sections that are physically and electrically connected together by electrically conductive flexible connectors. Each flexible connector can be secured between a pair of adjacent segments using a suitable mechanical fixing such as a screw or bolt, for example.

Each module or unit of the articulated mover can include a pair of short-circuit bar segments and one or more conducting bars connected between the segments. The one or more conducting bars can be received in a mount or core as described above, i.e., each module or unit of the articulated mover can include a mount for receiving its respective conducting bars.

Other features of the alternative electric stabiliser (i.e., relating to the track, planar stator etc.) and its method of operation are generally as described above.

The present invention further provides a method of stabilising a floating structure using an electric stabiliser comprising:
- a track;
- a DC linear motor comprising a planar stator that extends along the track, and a mover; and
- at least one active magnetic bearing positioned between the track and the mover;
- the method comprising using the at least one active magnetic bearing to levitate the mover and controlling the linear motor to move the mover backwards and forwards along the track as a stabiliser mass.

The electric stabiliser can be as described herein. In particular, the stator can comprise a polyphase stator winding, and the mover can comprise a plurality of permanent motor magnets facing the polyphase stator winding that define a plurality of mover poles of alternating polarity along a track direction. Alternatively, the mover can comprise a pair of electrically conductive short-circuit bars extending along the track direction and a plurality of electrically conductive conducting bars facing the polyphase stator winding. The conducting bars extend between the pair of short-circuit bars and are spaced apart along the track direction to define a squirrel-cage construction.

BRIEF DESCRIPTION OF THE DRAWINGS

FIGS. 9A and 9B are schematic views of the linear motor of the electric stabiliser showing the relative motion of the mover;

With reference to FIGS. 1 to 9B, an electric stabiliser 1 for a marine vessel comprises a U-shaped track 2 which extends in a track direction (along the X axis). Only part of the track 2 is shown in FIGS. 1 and 3. The track 2 includes a base 2a and a pair of upstanding opposing sides 2b, 2c that define a channel 4 in which a mover 6 is positioned. Suitable materials for the track 2 might include steel, cast iron, electrical steel laminations, for example. Depending on operational requirements, in a practical arrangement the track 2 can have a width of about 1 m to about 20 m and a length of about 5 m to about 100 m. The sides 2b, 2c of the track 2 can have a height of about 0.4 m to about 2 m.

The electric stabiliser 1 includes a direct current (DC) linear motor 8. The linear motor 8 includes a planar stator 10 that is mounted centrally on the base of the track 2. The planar stator 10 extends along the track 2 in the track direction.

Figure 6:
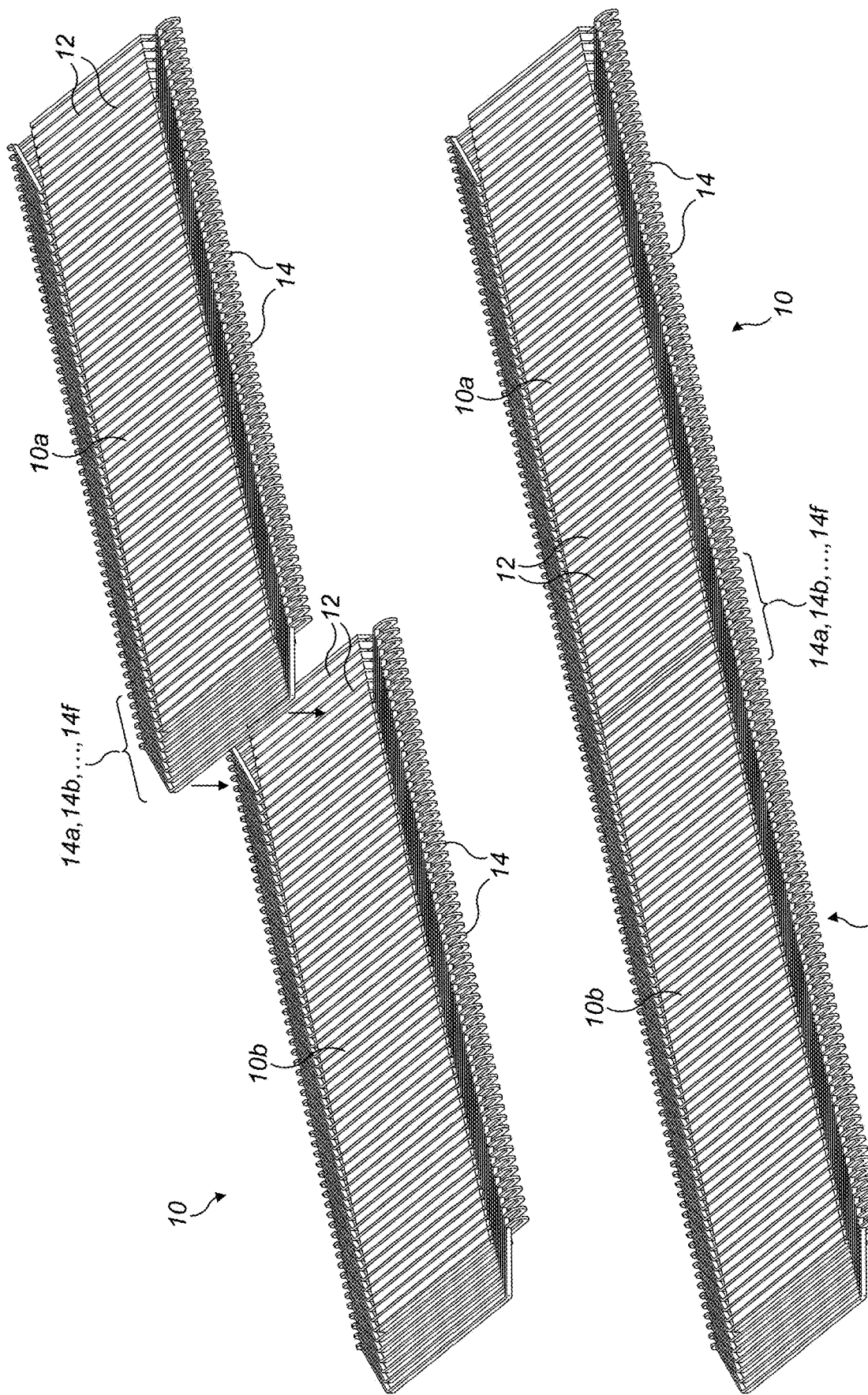
FIG. 6 is a detail view of the modular planar stator of the electric stabiliser of FIG. 1.

As shown in FIG. 6, the planar stator 10 has a modular construction—i.e., it is constructed from a plurality of modules or units that are assembled together along the track and connected together by any suitable means. The planar stator 10 has a plurality of winding slots 12 spaced apart along the track 2 for receiving the winding coils 14 of a polyphase stator winding 16. The winding slots 12 are formed in a magnetically permeable part of the planar stator 10. The planar stator 10 comprises a plurality of thin sheets or laminations, separated by electrically insulating layers, stacked across the track 2 in a transverse direction (along the Y axis) to minimise eddy current losses. The thin sheets or laminations can be electrically insulated from each other by a thin coating of insulating varnish or an oxide layer, for example.

Figure 7:
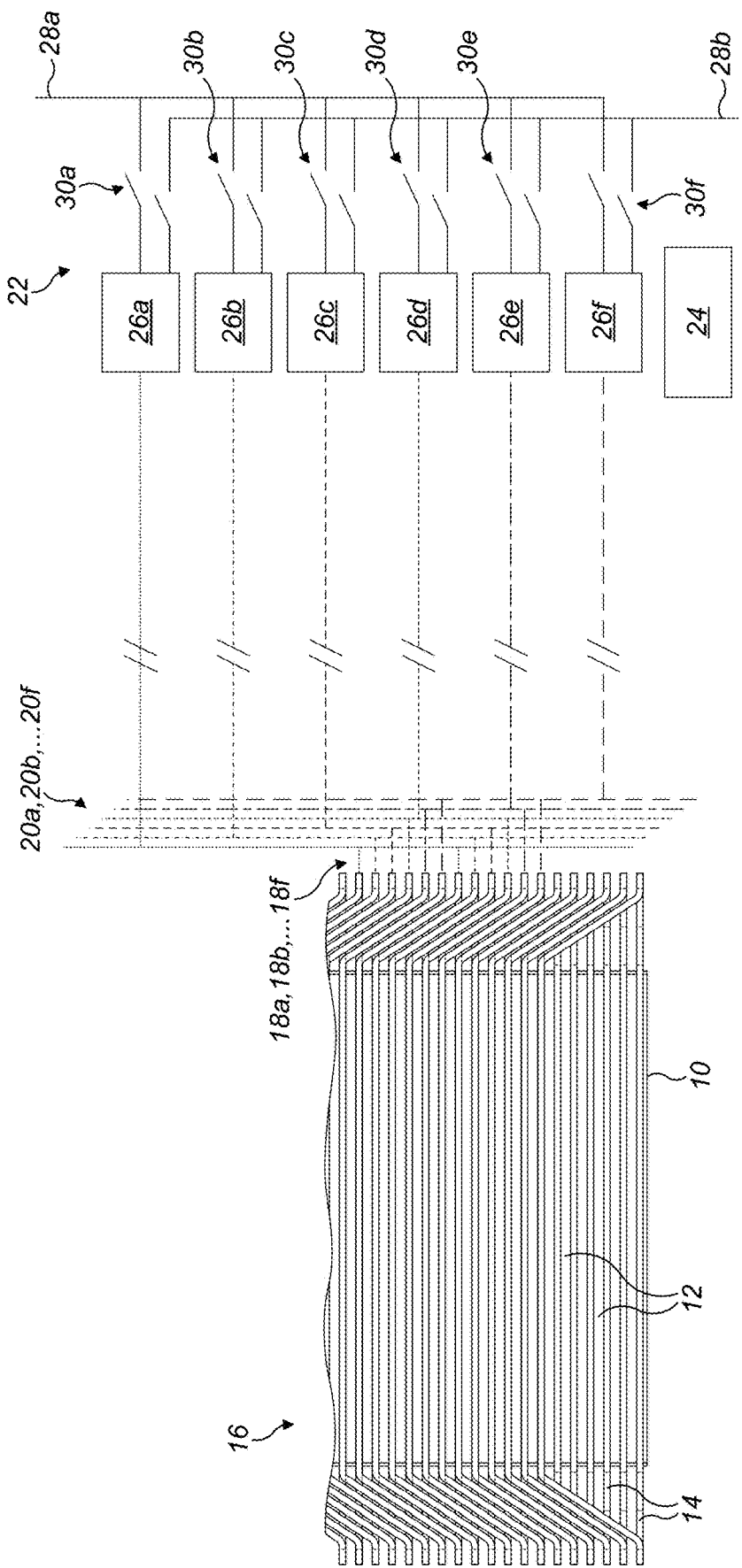
FIG. 7 is a schematic view of the polyphase stator winding and converter system.

Referring to FIG. 7, the polyphase stator winding 16 has six phase windings 18a, 18b, ..., 18f, each phase winding defining a phase of the polyphase stator winding (i.e., phases A, B, ..., F) and comprising a plurality of winding coils 14 that are received in the winding slots. Busbars or cables 20 for interconnecting the winding coils 14 of each phase winding 18a, 18b, ..., 18f run alongside the planar stator 10. The winding coils 14 are two-layer coils and each winding coil includes a pair of winding runs that are received in a corresponding pair of winding slots. Each winding slot 12 in the planar stator 10 receives the winding run of a pair of winding coils, with the winding runs being positioned on top of each other. This is shown schematically in FIGS. 9A and 9B where the winding runs of the winding coils 14 are arranged in an upper layer and a lower layer. A particular winding coil is highlighted by shading and has a first winding run that is received in a first winding slot as a lower winding run and a second winding run that is received in a second winding slot as an upper winding run. The first and second winding slots are separated by five intermediate winding slots. The highlighted winding coil is part of the phase winding 18a that defines the phase A of the polyphase stator winding. The phases A, B, ..., F are labelled in FIGS. 9A and 9B. The current flow direction through each winding run is also labelled in FIGS. 9A and 9B where the plus sign ("+") indicates current flow in a first direction (e.g., a positive direction) and the minus sign ("−") indicates current flow in a second and opposite direction (e.g., a negative direction).

FIG. 6 shows how some of the winding coils span two adjacent modules or units of the planar stator. For example, six of the winding coils 14a, 14b, ..., 14f have a winding run received in a winding slot of one module or unit 10a as a lower winding run and the other winding run received in a winding slot of an adjacent module or unit 10b as an upper winding run.

The polyphase stator winding 16 is designed to operate normally with six phase windings 18a, 18b, ..., 18f, but the stator winding, and its associated power converter system, can be adapted to operate safely with fewer phase windings—e.g., with five phase windings. This provides improved redundancy in the event of a fault in one of the phase windings.

The polyphase stator winding 16 is electrically connected to a power converter system 22 that can be controlled by a controller 24. In the power converter system 22 shown in FIG. 7, the winding coils 14 of each phase winding 18a, 18b, ..., 18f of the polyphase stator winding 16 are connected to a respective busbar or cable 20a, 20b, ..., 20f which is connected, in turn, to a respective converter unit 26a, 26b, ..., 26f of the power converter system. In particular, the winding coils of a first phase winding 18a that defines a first phase (or phase A) of the polyphase stator winding are connected to a first busbar or cable 20a that is connected to a first converter unit 26a, the winding coils of a second phase winding 18b that defines a second phase (or phase B) of the polyphase stator winding are connected to a second busbar or cable 20a that is connected to a second converter unit 26b, the winding coils of a third phase winding 18c that defines a third phase (or phase C) of the polyphase stator winding are connected to a third busbar or cable 20c that is connected to a third converter unit 26c, and so on for the other phase windings 18d, ..., 18f. The converter units 26a, 26b, ..., 26c are electrically connected in parallel to two alternating current (AC) power supplies 28a, 28b by means of an interposing switch or breaker 30a, 30b, ..., 30f. As noted above, each converter unit 26a, 26b, ..., 26f is electrically connected to one of the busbars or cables 20a, 20b, ..., 20f for interconnecting the winding coils 14 of each phase winding 18a, 18b, ..., 18f. Electrically connecting the converter units 26a, 26b, ..., 26f to two separate AC power supplies 28a, 28b provides improved redundancy in the event of a fault in one of the AC power supplies. Each converter unit 26a, 26b, ..., 26f is an AC/DC converter with AC input terminals connected in parallel to the AC power supplies 28a, 28b, and DC output terminals connected to the respective busbar or cable 20b, ..., 20f.

A mover 6 is positioned in the channel 4 of the track 2 and is adapted to move forwards and backwards along the track as a stabiliser mass. The mover 6 has a main body 32 with an upper surface 32a, a lower surface 32b and side surfaces 32c, 32d. The main body 32 comprises a block of material with a mass that is sufficient to function as the stabiliser mass for the marine vessel. In a practical arrangement, the mass of the main body 32 can be in the range of about 100 kg to about 250 metric tonnes depending on operational requirements. Suitable materials for the main body 32 might include steel, cast iron, electrical steel laminations, for example.

Both sides 32c, 32d of the main body 32 include a plurality of rollers 34 as guide members. The rollers 34 are adapted to contact the facing side 2a, 2b of the track 2 to guide and locate the levitated mover 6 as it moves forwards and backwards along the track. The rollers 34 are arranged in two rows—i.e., an upper row and a lower row as shown. It will be readily understood that other guide members can also be used.

The mover 6 has a longitudinal axis 36 that is aligned with the track direction (and parallel with X axis) and a transverse axis 38 (parallel with the Y axis).

The mover 6 includes a plurality of permanent motor magnets 40 facing the polyphase stator winding 16. The permanent motor magnets 40 define a plurality of mover poles of alternating polarity (i.e., north and south polarity) along its longitudinal axis. In the Figures, the respective polarity of the permanent motor magnets 40—and therefore the mover pole—is indicated schematically by light and dark shading. A motor mount 42 is formed in a recess in the centre of the lower surface 32b of the main body 32 for mounting the permanent motor magnets 40. The motor mount 42 extends along the longitudinal axis 36 of the mover 6. The motor mount 42 comprises a plurality of thin sheets or laminations of magnetically permeable (preferably ferromagnetic) material, separated by electrically insulating layers, stacked along the transverse axis 38 of the mover 6 to minimise eddy current losses. The motor mount 42 defines a planar mounting structure with a mounting surface on which the permanent motor magnets 40 are mounted by any suitable means. The permanent motor magnets are also located in the recess in the main body 32 and are substantially flush with the lower surface 32b of the mover 6.

The electric stabiliser 1 further includes a pair of active magnetic bearings 44, 48 positioned between the track 2 and the mover 6 for selectively levitating the mover. A first active magnetic bearing 44 is positioned at a first side of the mover 6 and a second active magnetic bearing 48 is positioned at a second side of the mover.

Each active magnetic bearing 44, 48 includes a pair of electromagnets and a plurality of permanent bearing magnets facing each electromagnet. The plurality of permanent bearing magnets is formed on a lower part of the mover 6 and each electromagnet is mounted on the base of the track 2. More particularly, the first active magnetic bearing 44 includes a first pair of electromagnets 46a, 46b and the second active magnetic bearing 48 includes a second pair of electromagnets 50a, 50b.

Figure 1:
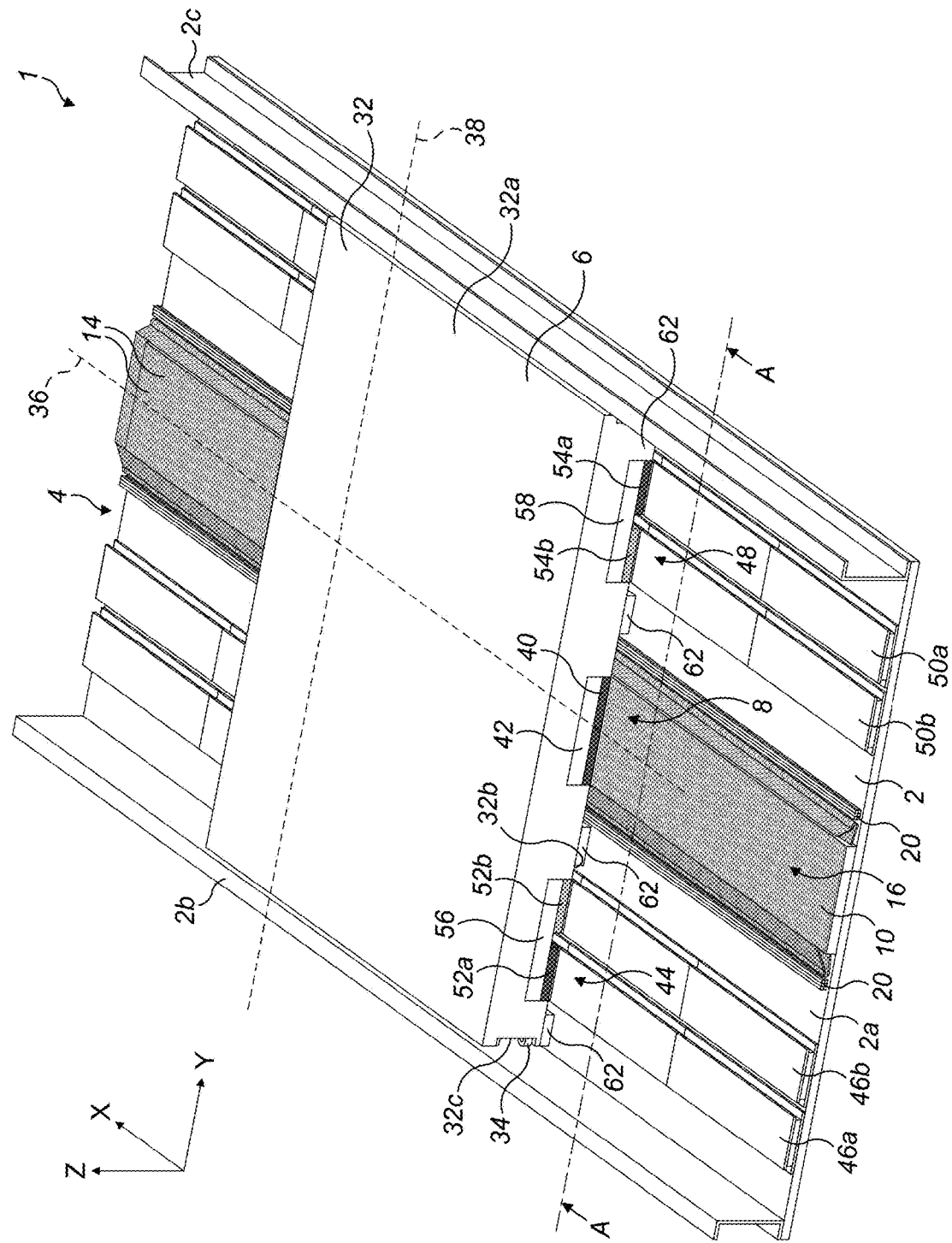
FIG. 1 is a perspective view of an electric stabiliser according to the present invention.
Figure 2:
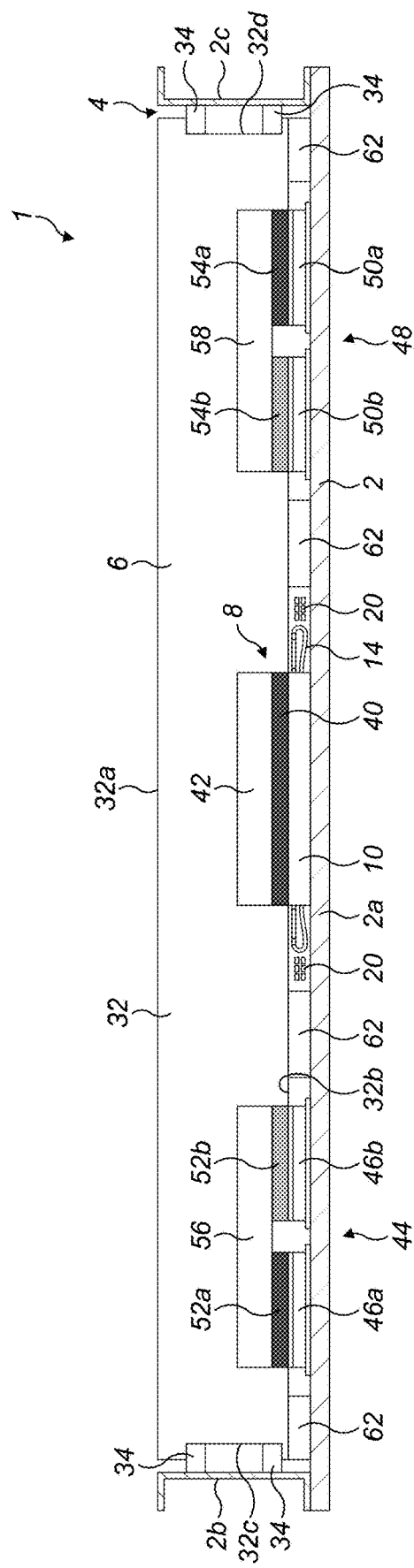
FIG. 2 is a cross-section view of the electric stabiliser of FIG. 1 along line A-A.
Figure 3:
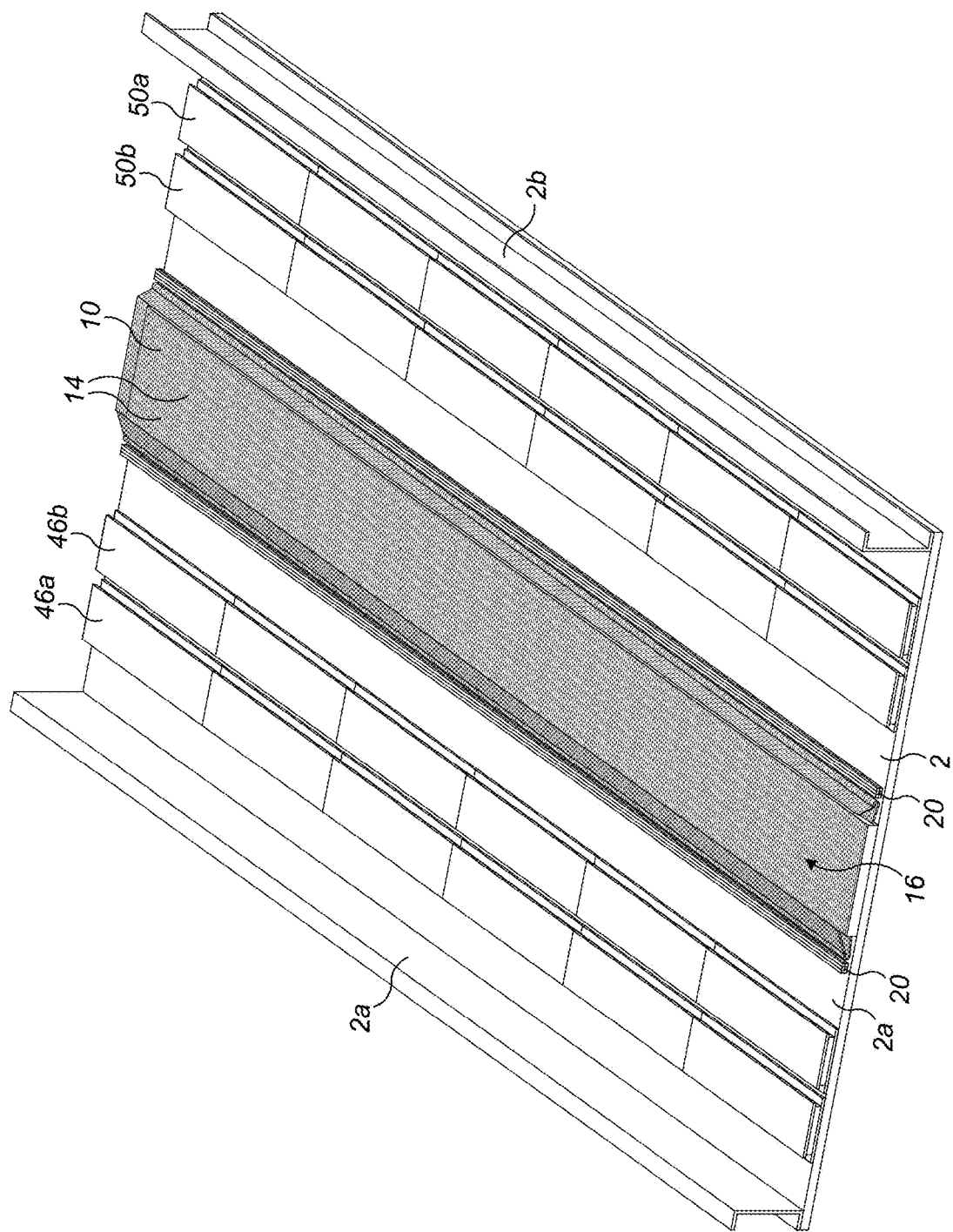
FIG. 3 is a perspective view of the U-shaped track of the electric stabiliser of FIG. 1.
Figure 4:
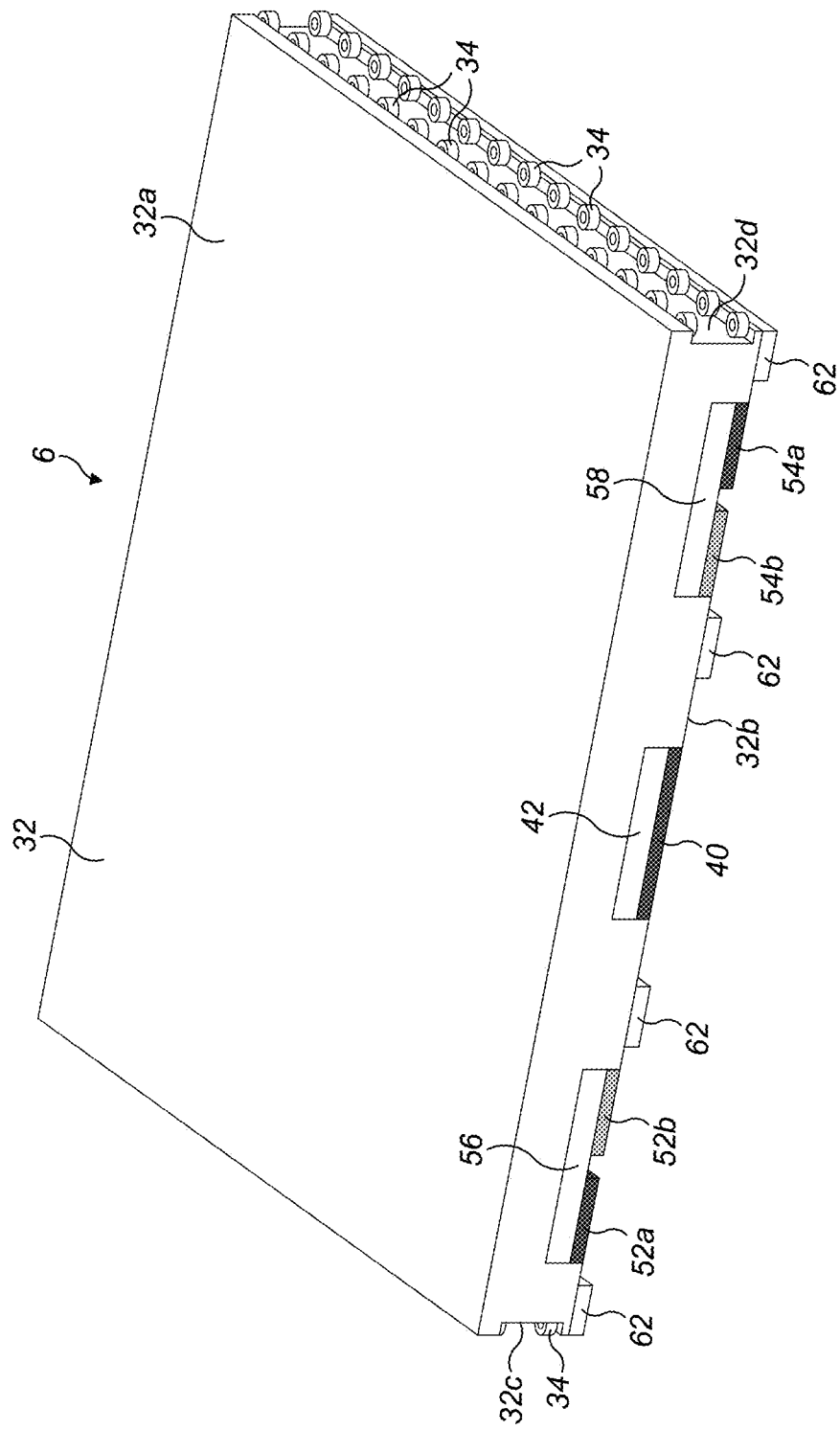
FIG. 4 is an upper perspective view of the mover of the electric stabiliser of FIG. 1.
Figure 5:
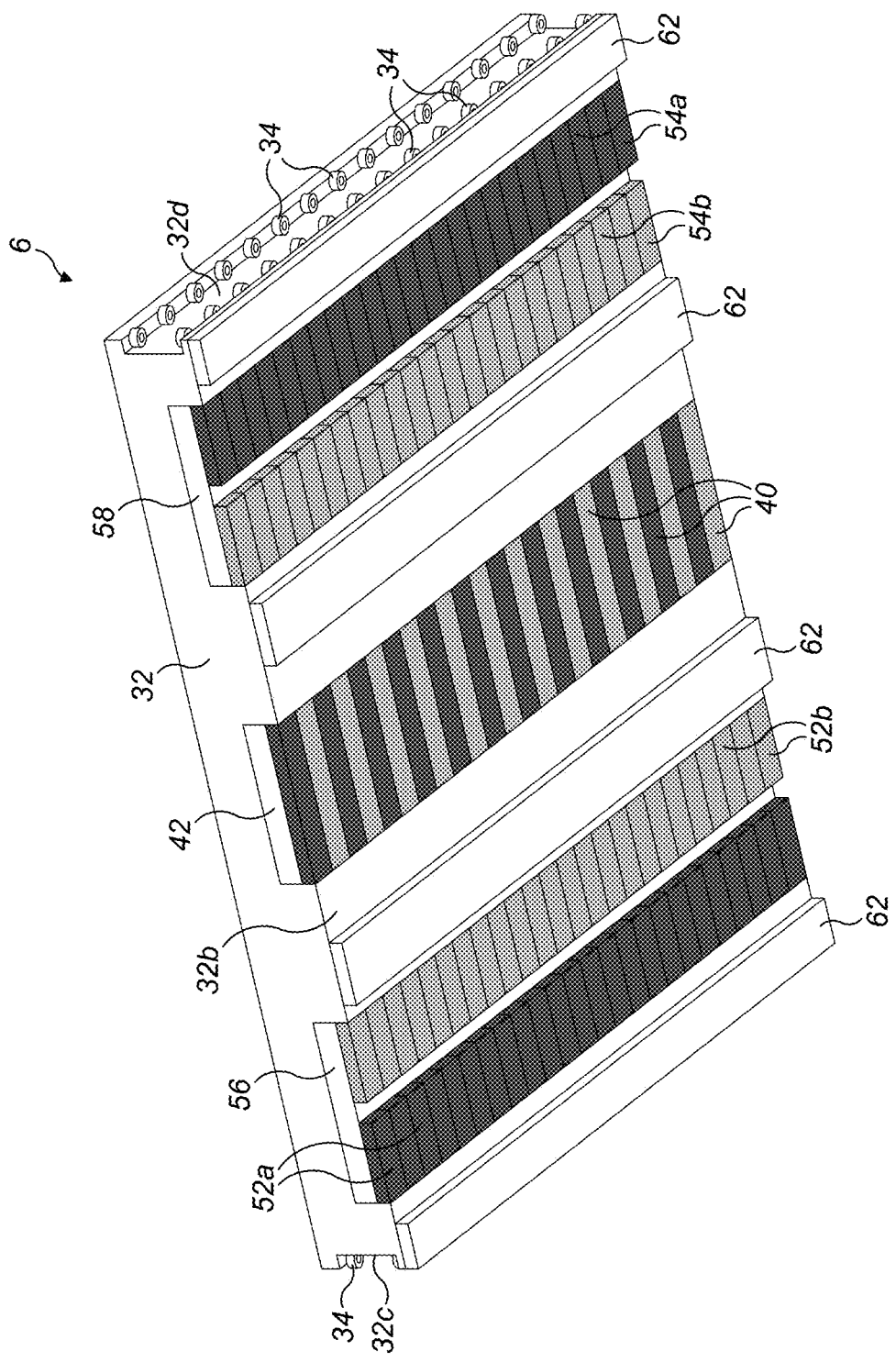
FIG. 5 is a lower perspective view of the mover of the electric stabiliser of FIG. 1.

Each electromagnet has a modular construction—i.e., it is constructed from a plurality of modules or units that are assembled together along the track 2 as shown in FIGS. 1 and 3. Each electromagnet includes one or more coils formed on a magnetic core, which can comprise a plurality of thin sheets or laminations of magnetically permeable (preferably ferromagnetic) material, separated by electrically insulating layers, stacked along the track to minimise eddy current losses.

Facing the first pair of electromagnets 46a, 46b, the lower part of the mover 6 includes a first plurality of permanent bearing magnets 52a defining a first bearing pole of first polarity (e.g., north polarity) extending along the longitudinal axis 36 of the mover and a second plurality of permanent bearing magnets 52b defining a second bearing pole of second and opposite polarity (e.g., south polarity) extending along the longitudinal axis of the mover. The first and second plurality of permanent bearing magnets 52a, 52b are arranged side by side and are spaced apart along the transverse axis 38 of the mover 6. As shown, the first plurality of permanent bearing magnets 52a are arranged opposite one of the pair of electromagnets 46a and the second plurality of permanent bearing magnets 52b are arranged opposite the other of the pair of electromagnets 46b.

Facing the second pair of electromagnets 50a, 50b, the lower part of the mover 6 includes a third plurality of permanent bearing magnets 54a defining a third bearing pole of first polarity (e.g., north polarity) extending along the longitudinal axis 36 of the mover and a fourth plurality of permanent bearing magnets 54b defining a fourth bearing pole of second and opposite polarity (e.g., south polarity) extending along the longitudinal axis of the mover. The third and fourth plurality of permanent bearing magnets 54a, 54b are arranged side by side and are spaced apart along the transverse axis 38 of the mover 6. As shown, the first plurality of permanent bearing magnets 54a are arranged opposite one of the pair of electromagnets 50a and the second plurality of permanent bearing magnets 54b are arranged opposite the other of the pair of electromagnets 50b.

The mover 6 includes two bearing mounts 56, 58 for mounting the permanent bearing magnets 52a, 52b and 54a, 54b. Each bearing mount 56, 58 extends along the longitudinal axis 36 of the mover 6. Each bearing mount 56, 58 comprises a plurality of thin sheets or laminations of magnetically permeable (preferably ferromagnetic) material, separated by electrically insulating layers, stacked along the longitudinal axis 36 of the mover 6 to minimise eddy current losses. Each bearing mount 56, 58 defines a planar mounting structure with a mounting surface on which permanent bearing magnets 52a, 52b and 54a, 54b are mounted by any suitable means. Each bearing mount 56, 58 is located in a respective recess in the lower surface of the mover 6 that faces the respective electromagnet. The permanent bearing magnets 52a, 52b and 54a, 54b are also located in the respective recess in the main body 32 and are substantially flush with the lower surface 32b of the mover 6.

Figure 8A:
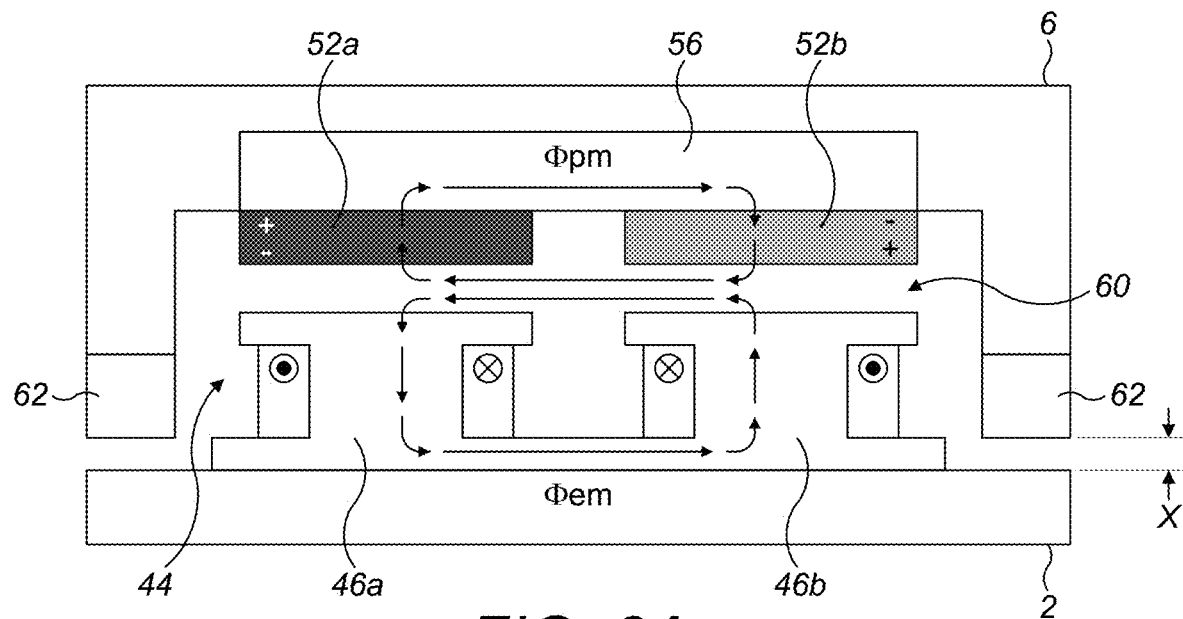
FIGS. 8A and 8B are detail views of an active magnetic bearing of the electric stabiliser of FIG. 1.
Figure 8B:
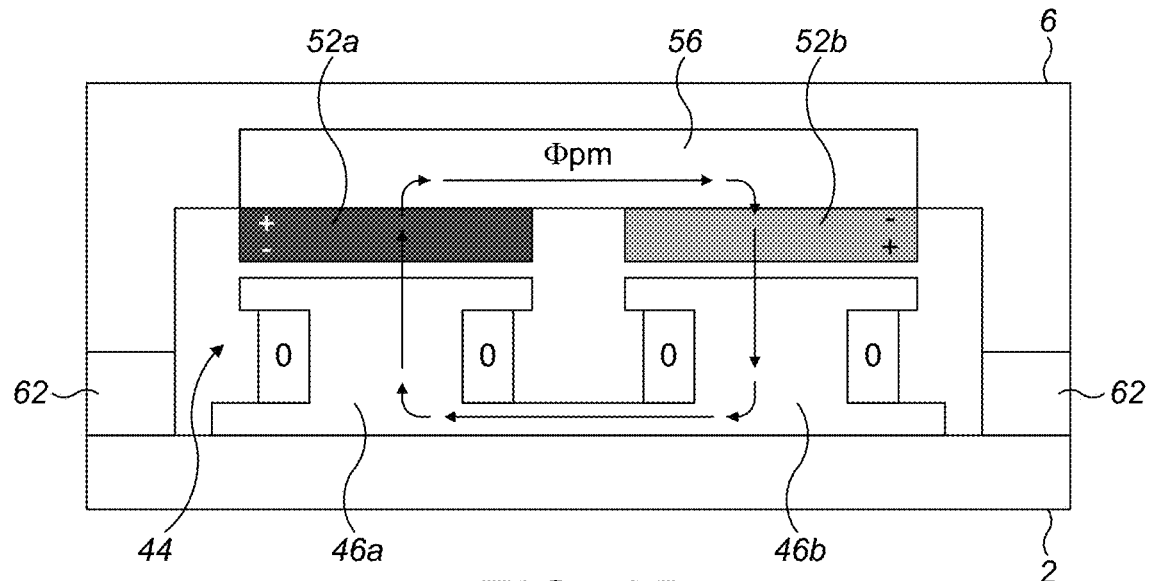

For each pair of electromagnets 46a, 46b and 50a, 50b to generate the magnetic field to selectively levitate the mover 6, current is supplied to the coil(s) of one of the pair of electromagnets in a first flow direction to define a first electromagnet pole of first polarity (e.g., north polarity) and to the coil(s) of the other of the pair of electromagnets in a second and opposite flow direction to define a second electromagnet pole of second and opposite polarity (e.g., south polarity). This is shown in FIG. 8A for the first active magnetic bearing 44. More particularly, the current flow direction through each electromagnet 46a, 46b of the first active magnet bearing 44 is labelled in FIG. 8A where the cross ("x") indicates current flow in a first direction and the dot (".") indicates a current flow in a second and opposite direction. In FIG. 8B, the lack of current flow through each electromagnet 46a, 46b is indicated by "0".

FIG. 8A also shows how, for each active magnetic bearing, the facing permanent bearing magnets 52a, 52b on the mover 6 generate an additional magnetic field $\Phi_{pm}$ that interacts with the magnetic field $\Phi_{em}$ generated by the pair of electromagnets 46a, 46b when they are supplied with electrical power. The interaction generates an upwardly acting repulsive magnetic force that "pushes" the permanent bearing magnets 52a, 52b away from the electromagnets 46a, 46b. It therefore follows that the mover 6 is "pushed" upwards away from the track 2 by this interaction. The addition of the permanent bearing magnets 52a, 52b means that the mover 6 can be selectively levitated without the need for one or more active magnetic bearings to be positioned above the mover to "pull" the mover upwards away from the track. It also means that the airgap 60 between the facing surfaces of the electromagnets 46a, 46b and the permanent bearing magnets 52a, 52b when the mover is levitated can be significantly increased to between about 5 mm and about 10 mm in a practical arrangement. Even if the mover 6 bends slightly during levitation, the increased airgap can ensure that there is no physical contact between the lower part of the mover 6 and the rest of the electric stabiliser.

In FIG. 8A the electromagnets 46a, 46b are energised and the mover 6 is levitated above the track 2.

In FIG. 8B the electromagnets 46a, 46b are not energised and the mover 6 is in physical contact with the track 2. FIG. 8B shows the magnetic field $\Phi_{pm}$ generated by the permanent bearing magnets 52a, 52b. This magnetic field generates a downwardly acting attractive magnetic force that "pulls" the permanent bearing magnets 52a, 52b towards the magnetic core of the facing electromagnets 46a, 46b.

The mover 6 comprises four non-magnetic feet 62 adapted to contact the track 2 when the mover is not levitated by the active magnetic bearings 44, 48. When the feet 62 are in physical contact with the track 2, there is no physical contact between the mover 6 and the planar stators 10 or between the mover and the electromagnets 46a, 46b and 50a, 50b.

Each foot 62 is formed as a downwardly extending protrusion. Each foot 62 extends along the longitudinal axis 36 of the mover 6 and is formed on a lower part of the mover. The feet 62 are spaced apart along the transverse axis 38 of the mover. Each foot 62 is sized and shaped so that it does not carry any significant magnetic flux when it is in physical contact with the track 2. The magnetic fields generated by the permanent motor and bearing magnets are confined to the planar stator and the magnetic cores of the electromagnets. This prevents any magnetic attraction between the feet 62 and the track 2, which might cause damage to the track surface as a result of the mover 6 being repeatedly levitated. For example, FIG. 8B shows how the magnetic field $\Phi_{pm}$ generated by the permanent bearing magnets 52a, 52b does not extend into the feet 62, but is confined substantially within the laminated bearing mount 56 and the magnetic cores of the facing electromagnets 46a, 46b.

Suitable non-magnetic materials for the one or more feet 62 might include stainless steel, for example.

The electric stabiliser 1 can be operated in two operating states, namely an off-state where the mover 6 is not levitated by the active magnetic bearings 44, 48, i.e., when no or insufficient electrical power is supplied to the electromagnets of the active magnetic bearings, and an on-state where the mover is levitated above the track base 2a by the active magnetic bearings, i.e., when sufficient electrical power is supplied to the electromagnets.

In the off-state, the mover 6 is stationary and its non-magnetic feet 62 are in physical contact with the track 2. The friction contact between the non-magnetic feet 62 and the track 2 is sufficient to maintain the mover 6 in a fixed and stationary position on the track without the need for hydraulic or mechanical brakes.

If it is necessary to move the mover 6 along the track 2, in response to a rolling or pitching movement of the marine vessel, for example, electrical power is supplied to the electromagnets of the active magnetic bearings 44, 48 to transition the electric stabiliser 1 to the on-state. As described in more detail below, the mover 6 will levitate if the total upwardly acting repulsive magnetic force generated by the interaction between the magnetic fields generated by the permanent bearing magnets and the electromagnets of the active magnetic bearings is equal to the total weight of the mover plus the total of any downwardly acting forces such as the attractive magnetic force between the planar stator 10 that is positioned below the mover 6 and the facing permanent motor magnets 40 on the lower part of the mover, and between the permanent bearing magnets 52a, 52b and 54a, 54b and the magnetic cores of the facing electromagnets 46a, 46b and 50a, 50b, for example. In some other arrangements, any downwardly acting attractive magnetic force between the planar stator 10 and the permanent motor magnets 40 might be reduced or substantially cancelled by positioning one or more planar stators above the mover to provide a corresponding upwardly acting attractive magnetic force, or by only positioning one or more planar stators at the side of the mover, for example. Such arrangements can also help to reduce bending of the mover when it is levitated, and some examples are described in more detail below with reference to FIGS. 11 to 14.

In the on-state, the non-magnetic feet 62 of the mover 6 are not in contact with the track 2 and the levitated mover can be stationary or can be driven forwards or backwards along the track by the DC linear motor 8. If the track 2 is inclined, because of the rolling or pitching movement of the marine vessel, for example, the linear motor 8 can be used to hold the mover 6 stationary preparatory to being moved. The switched DC current in the linear motor 8 can be controlled by the controller 24 to move the mover 6 forwards or backwards along the track 2. In particular, the mover 6 can be selectively driven forwards or backwards along the track 2 by the bidirectional linear driving force (or "thrust") that is generated by the interaction between the magnetic field produced by the switched DC current in the polyphase stator winding 16 and the magnetic field produced by the facing plurality of permanent motor magnets 40 on the mover 6. The controller 24 can control the supply of electrical power to one or more of the phase windings 18a, 18b, . . . , 18f of the polyphase stator winding 16 (i.e., it can control commutation) in order to move the mover 6 forwards or backwards along the track 2, typically with a positioning accuracy that corresponds to the slot pitch of the planar stator 10. This is shown in FIGS. 9A and 9B where the mover 6 moves relative to the planar stator 10 by a distance D that corresponds to the slot pitch when the phase winding 18a defining phase A of the polyphase stator winding 16 is commutated. In particular, it can be seen from FIGS. 9A and 9B that the current flow direction through the winding coils of the phase winding 18a is reversed. Sequential commutation of the phase windings defining phases B, C, . . . , F, A, B, C, . . . , F can continue until the mover 6 has been moved the necessary distance along the track 2.

When the mover 6 has been moved the necessary distance along the track 2, to dampen the rolling or pitching movement of the marine vessel, the DC linear motor 8 can be used to hold the mover stationary and the electric stabiliser 1 is transitioned to the off-state by ending the supply of electrical power to the electromagnets. The distance that the mover 6 needs to be moved along the track 2 to counter the rolling or pitching movement depends on the mass of the mover and can be determined by the controller 24 or by a separate stabilising controller of the marine vessel, for example, which receives other inputs such as the angle of roll or pitch of the marine vessel.

As soon as the electric stabiliser 1 is transitioned to the off-state, the stationary mover 6 will be brought directly into physical contact with the track 2 by the downwardly acting forces, including the total weight of the mover and the attractive magnetic forces mentioned above which "pull" the mover towards the track. As already noted above, the friction contact between the non-magnetic feet 62 and the track 2 is sufficient to maintain the mover 6 in a fixed and stationary position without the need for hydraulic or mechanical brakes that would increase cost and complexity. A further advantage is that the mover 6 will also be brought directly into physical contact with the track 2, and thereby maintained in a fixed and stationary position, if there is a fault which disrupts the supply of electrical power to the one or more electromagnets, for example. This provides a "fail safe" state for the mover 6 in case of a fault that prevents continued levitation of the mover.

Figure 10:
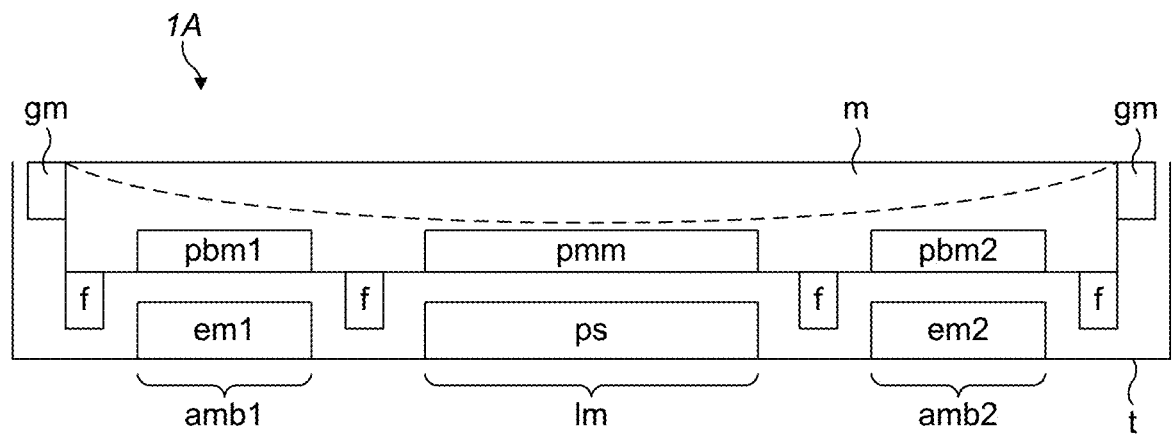
FIGS. 10 to 14 are schematic views of different electric stabiliser configurations according to the present invention.

FIG. 10 is a schematic diagram of the electric stabiliser shown in FIG. 1. The electric stabiliser 1A shown in FIG. 10 is suitable if there is a reduced height constraint (i.e., along the Z axis). For any given mass, the dimensions of the mover can be determined by the size of the volume that is available to accommodate the electric stabiliser. For example, if there is a limit on the overall height of the electric stabiliser, it may be necessary to increase the length of the mover, i.e., its dimension in the longitudinal direction. In a practical arrangement, the mover can have a length of about 1 m to about 50 m and a height of about 0.3 m to about 2 m. In a practical arrangement, the mover can have a width, i.e., its dimension in the transverse direction, of about 1 m to about 20 m to fit within the track channel.

In FIG. 10, the following labels are used to indicate the component parts of an electric stabiliser 1A:

"t" for the track (e.g., the track 2),
"m" for the mover (e.g., the mover 6),
"gm" for the guide members (e.g., the rollers 34),
"f" for the mover feet (e.g., the non-magnetic feet (62),
"lm" for the linear motor (e.g., the DC linear motor 8),
— "pmm" for the permanent motor magnets of the DC linear motor (e.g., the motor magnets 40),
"ps" for the planar stator of the DC linear motor (e.g., the planar stator 10),
"amb1" for the first active magnetic bearing (e.g., the active magnetic bearing 44),
"em1" for the electromagnets of the first active magnetic bearing (e.g., the electromagnets 46a, 46b),
"pbm1" for the permanent bearing magnets of the first active magnetic bearing (e.g., the bearing magnets 52a, 52b),
"amb2" for the second active magnetic bearing (e.g., the active magnetic bearing 48),
"em2" for the electromagnets of the second active magnetic bearing (e.g., the electromagnets 50a, 50b), and "pbm2" for the permanent bearing magnets of the second active magnetic bearing (e.g., the bearing magnets 54a, 54b).

For convenience, these labels correspond to the subscripts in the following equations.

When the electromagnets em1, em2 of the first and second active magnetic bearings amb1, amb2 are not energised, the downwardly acting braking force $F_{brake}$ acting on the mover m can be given as:

$$F_{brake} = (F_{amb1\_brake} + F_{amb2\_brake}) + F_{lm} + M \cdot g$$

where $F_{amb1\_brake}$ and $F_{amb2\_brake}$ are the downwardly acting attractive forces between the permanent bearing magnets pbm1, pbm2 and the electromagnets em1, em2 of the first and second active magnetic bearings amb1, amb2, $F_{lm1}$ is the downwardly acting attractive force between the planar stator ps and the facing permanent motor magnets pmm of the DC linear motor lm, M is the mass of the mover m, and g is the acceleration due to gravity. For the DC linear motor lm:

$$F_{lm} = \frac{(B_{lm})^2 A_{lm}}{2\mu_0}$$

where $B_{lm}$ is the linear motor airgap magnetic induction, $A_{lm}$ is the linear motor airgap area, and $\mu_0$ is the vacuum permeability.

For each active magnetic bearing amb1, amb2:

$$F_{ambi\_brake} = \frac{\mu_0 (h_{pbmi} \cdot H_{pbmi})^2 A_{ambi}}{(l_{ambi})^2} \quad i = 1, 2$$

where $h_{pbmi}$ is the height of the permanent bearing magnets pbmi of the respective active magnetic bearing ambi, $H_{pbmi}$ is the magnetic field of the permanent bearing magnets of the respective active magnetic bearing, $A_{ambi}$ is the respective active magnetic bearing area, and $l_{ambi}$ is the airgap of the respective active magnetic bearing—i.e., the distance between the permanent bearing magnets and the electromagnets of the respective active magnetic bearing when the electric stabiliser 1A is in the off-state and the mover m is in contact with the track t.

When the electromagnets are energised and the mover m is levitated above the track t, the force acting on the mover can be given as:

$$-(F_{amb1\_lev} + F_{amb2\_lev}) = (F_{lm} + M \cdot g)$$

where $F_{amb1\_lev}$ and $F_{amb2\_lev}$ are the upwardly acting attractive forces generated by the first and second active magnetic bearings amb1, amb2 when the electromagnets em1, em2 are energised. For each active magnetic bearing amb1, amb2:

$$F_{ambi\_lev} = \frac{\mu_0 (h_{pmbi} \cdot H_{pmbi})^2 (N \cdot I) A_{ambi}}{(l_{ambi} + x)^2} \quad i = 1, 2$$

where N is the number of electromagnet turns of the respective active magnetic bearing ambi, I is the electromagnet current of the respective active magnetic bearing, and x is the levitation displacement when the electric stabiliser 1A is in the on-state and the mover m is levitated above the track t.

For the above equations, the magnetic saturation effects in any ferromagnetic parts are neglected. It can be seen that the amplitude of the active magnetic bearing force can be increased by maximising the height and the magnetic field of the permanent bearing magnets and the surface area of the electromagnets. Increasing the excitation magnetic field of the electromagnets (i.e., N×I) increases the levitation distance. Combining the electromagnets with permanent bearing magnets also increases the levitation distance (i.e., x).

The DC linear motor of the electric stabiliser 1A includes a single planar stator. In other arrangements, the linear motor can include two or more planar stators, each planar stator comprising a polyphase stator winding. The mover can further comprise one or more additional plurality of permanent motor magnets that define an additional plurality of mover poles of alternating polarity along the track direction, each additional plurality of permanent motor magnets facing a respective polyphase stator winding. Each planar stator can be positioned below the mover, above the mover, or alongside the mover. It will be readily understood that in practice the linear motor can include any suitable number of planar stators, which can be arranged in different ways depending on the size of the volume that is available to accommodate the electric stabiliser and on operational requirements. The planar stators can also be arranged to reduce bending when the mover is levitated. For example, one or more planar stators can be positioned:

below the mover, e.g., on the base of the track, with facing permanent motor magnets being provided on a lower part of the mover, and/or above the mover with facing permanent motor magnets being provided on an upper part of the mover, and/or alongside the mover, e.g., on the sides of the track, with facing permanent motor magnets being provided on a side part of the mover.

Figure 11:
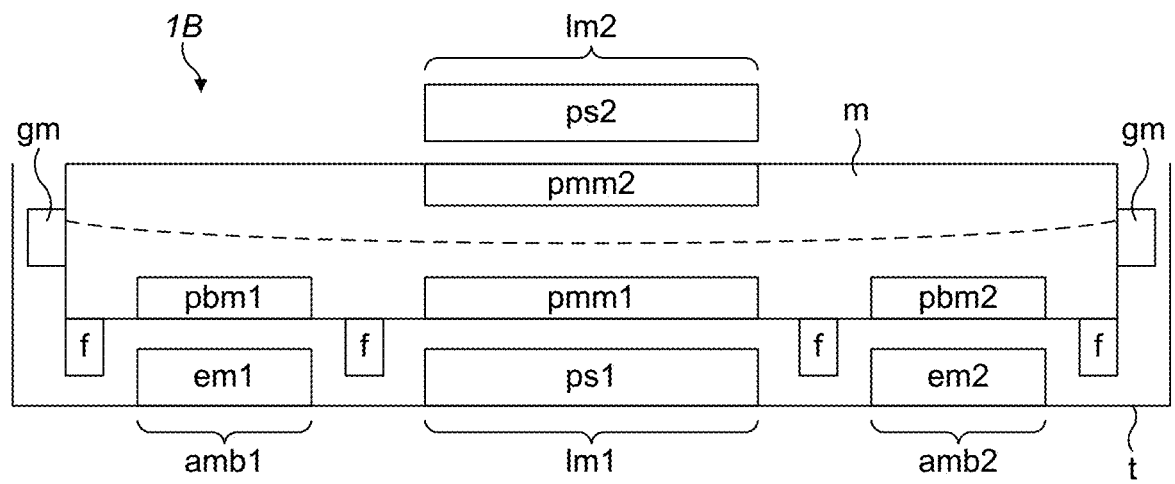

FIG. 11 is a schematic diagram of an alternative electric stabiliser 1B that reduces bending of the mover m when levitated. A first planar stator (labelled "ps1") is positioned below the mover m and include a first polyphase stator winding. The mover m includes a first plurality of permanent motor magnets (labelled "pmm1") facing the first polyphase stator winding that define a first plurality of mover poles of alternating polarity (i.e., north and south polarity) along its longitudinal axis. A second planar stator (labelled "ps2") is positioned above the mover m and includes a second polyphase stator winding. The mover m includes a second plurality of permanent motor magnets (labelled "pmm2") facing the second polyphase stator winding that define a second plurality of mover poles of alternating polarity (i.e., north and south polarity) along its longitudinal axis. The first planar stator ps1 and the first plurality of permanent motor magnets pmm1 define a first part of the DC linear motor (labelled "lm1"), and the second planar stator ps2 and the second plurality of permanent motor magnets pmm2 define a second part of the DC linear motor (labelled "lm2").

When the electromagnets are not energised, the downwardly acting braking force $F_{brake}$ acting on the mover m can be given as:

$$F_{brake} = (F_{amb1\_brake} + F_{amb2\_brake}) + (F_{lm1} - F_{lm2}) + M \cdot g$$

where $F_{lm1}$ is the downwardly acting attractive force between the first planar stator ps1 and the facing permanent motor magnets pmm1 and $F_{lm2}$ is the upwardly acting attractive force between the second planar stator ps2 and the facing permanent motor magnets pmm2. For each part of the DC linear motor lm1, lm2:

$$F_{lmi} = \frac{(B_{lmi})^2 A_{lmi}}{2\mu_0} \quad i = 1, 2$$

The airgap of the first part of the DC linear motor lm1 is reduced by distance x and the airgap of the second part of the DC linear motor lm2 is increased by distance x therefore the airgap magnetic induction $B_{lm1}$ will be greater than $B_{lm2}$ and the difference between the attractive forces, i.e., ($F_{lm1}-F_{lm2}$), contributes to the braking force.

When the electromagnets are energised and the mover m is levitated above the track t, the force acting on the mover can be given as:

$(F_{amb1\_lev}+F_{amb2\_lev})=(F_{lm1}-F_{lm2})+M \cdot g$

Typically the attractive forces $F_{lm1}$ and $F_{lm2}$ will be substantially equal because the airgap of the first part of the linear motor lm1 is substantially equal to the airgap of the second part of the linear motor lm2, so that:

$-(F_{amb1\_lev}+F_{amb2\_lev})=M \cdot g$

In this alternative electric stabiliser 1B, the downwardly acting attractive magnetic force between the first planar stator ps1 and the first plurality of permanent motor magnets pmm1 is substantially cancelled by positioning the second planar stator ps2 above the mover m to provide a corresponding upwardly acting attractive magnetic force. This helps to reduce bending of the mover when it is levitated. In FIGS. 10 to 13, the bending of the mover is indicated schematically by the dashed line extending between the sides of the mover m.

Figure 12:
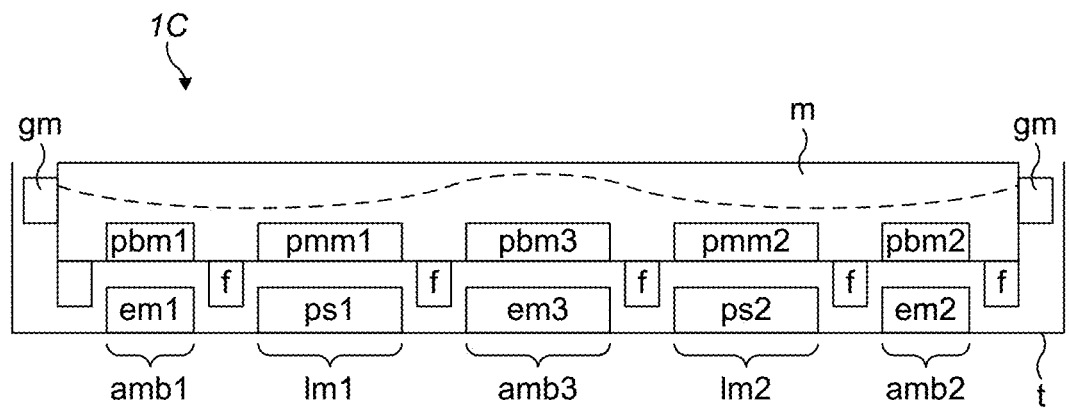

FIG. 12 is a schematic diagram of an alternative electric stabiliser 1C that reduces bending of the mover when levitated. A first planar stator (labelled "ps1") is positioned below the mover m and includes a first polyphase stator winding. The mover m includes a first plurality of permanent motor magnets (labelled "pmm1") facing the first polyphase stator winding that define a first plurality of mover poles of alternating polarity (i.e., north and south polarity) along its longitudinal axis. A second planar stator (labelled "ps2") is positioned below the mover m and includes a second polyphase stator winding. The mover m includes a second plurality of permanent motor magnets (labelled "pmm2") facing the second polyphase stator winding that define a second plurality of mover poles of alternating polarity (i.e., north and south polarity) along its longitudinal axis. The first planar stator ps1 and the first plurality of permanent motor magnets pmm1 define a first part of the DC linear motor (labelled "lm1"), and the second planar stator ps2 and the second plurality of permanent motor magnets pmm2 define a second part of the DC linear motor (labelled "lm2"). A third active magnetic bearing (labelled "amb3") is also provided in the centre of the track t.

When the electromagnets are not energised, the downwardly acting braking force $F_{brake}$ acting on the mover m can be given as:

$F_{brake}=(F_{amb1\_brake}+F_{amb2\_brake}+F_{amb3\_brake})+(F_{lm1}+F_{lm2})+M \cdot g$ where $F_{amb3\_brake}$ is the downwardly acting attractive force between the permanent bearing magnets pbm3 and the electromagnets em3 of the third active magnetic bearing amb3.

When the electromagnets are energised and the mover m is levitated above the track t, the force acting on the mover can be given as:

$-(F_{amb1\_lev}+F_{amb2\_lev}+F_{amb3\_lev})=(F_{lm1}+F_{lm2})+M \cdot g$ where $F_{amb3\_lev}$ is the upwardly acting attractive force generated by the third active magnetic bearing amb3 when the electromagnets are energised.

Figure 13:
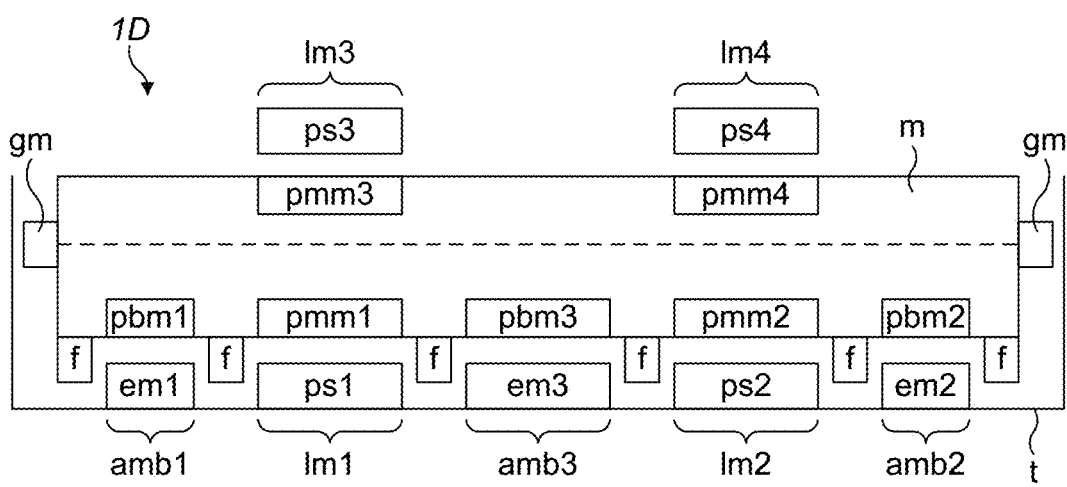

FIG. 13 is a schematic diagram of an alternative electric stabiliser 1D which is similar to the electric stabiliser 1C shown in FIG. 12 but with substantially no bending of the mover when levitated. Third and fourth planar stators (labelled "ps3" and "ps4") are positioned above the mover m and include third and fourth polyphase stator windings. The mover m includes a third and fourth plurality of permanent motor magnets (labelled "pmm3" and "pmm4") facing the third and fourth polyphase stator windings that define a third and fourth plurality of mover poles of alternating polarity (i.e., north and south polarity) along its longitudinal axis. The third planar stator and the third plurality of permanent motor magnets define a third part of the DC linear motor (labelled "lm3") and the fourth planar stator, and the fourth plurality of permanent motor magnets define a fourth part of the DC linear motor (labelled "lm4").

When the electromagnets are not energised, the braking force $F_{brake}$ acting on the mover m can be given as:

$F_{brake}=(F_{amb1\_brake}+F_{amb2\_brake}+F_{amb3\_brake})+(F_{lm1}-F_{lm3})+(F_{lm2}-F_{lm4})+M \cdot g$ where $F_{lm1}$ and $F_{lm2}$ are the downwardly acting attractive forces between the first and second planar stators ps1, ps2 and the facing permanent motor magnets pmm1, pmm2 and where $F_{lm3}$ and $F_{lm4}$ are the upwardly acting attractive forces between the third and fourth planar stators ps3, ps4 and the facing permanent motor magnets pmm3, pmm4.

The airgaps of the first and second parts of the DC linear motor lm1, lm2 are reduced by distance x and the airgaps of the third and fourth parts of the DC linear motor lm3, lm4 are increased by distance x therefore the airgap magnetic inductions $B_{lm1}$ and $B_{lm2}$ will be greater than $B_{lm3}$ and $B_{lm4}$ and the difference between the attractive forces, i.e., ($F_{lm1}-F_{lm3}$) and ($F_{lm2}-F_{lm4}$), contributes to the braking force.

When the electromagnets are energised and the mover m is levitated above the track t, the force acting on the mover can be given as:

$(F_{amb1\_lev}+F_{amb2\_lev}+F_{amb3\_lev})=(F_{lm1}-F_{lm3})+)(F_{lm2}-F_{lm4})+M \cdot g$ Typically the attractive forces $F_{lm1}$ and $F_{lm3}$ will be substantially equal and the attractive forces $F_{lm2}$ and $F_{lm4}$ will be substantially equal because the airgaps of the first and second parts of the DC linear motor lm1 and lm2 are substantially equal to the airgaps of the third and fourth parts of the DC linear motor lm3 and lm4, so that:

$-(F_{amb1\_lev}+F_{amb2\_lev}+F_{amb3\_lev})=M \cdot g$

Figure 14:
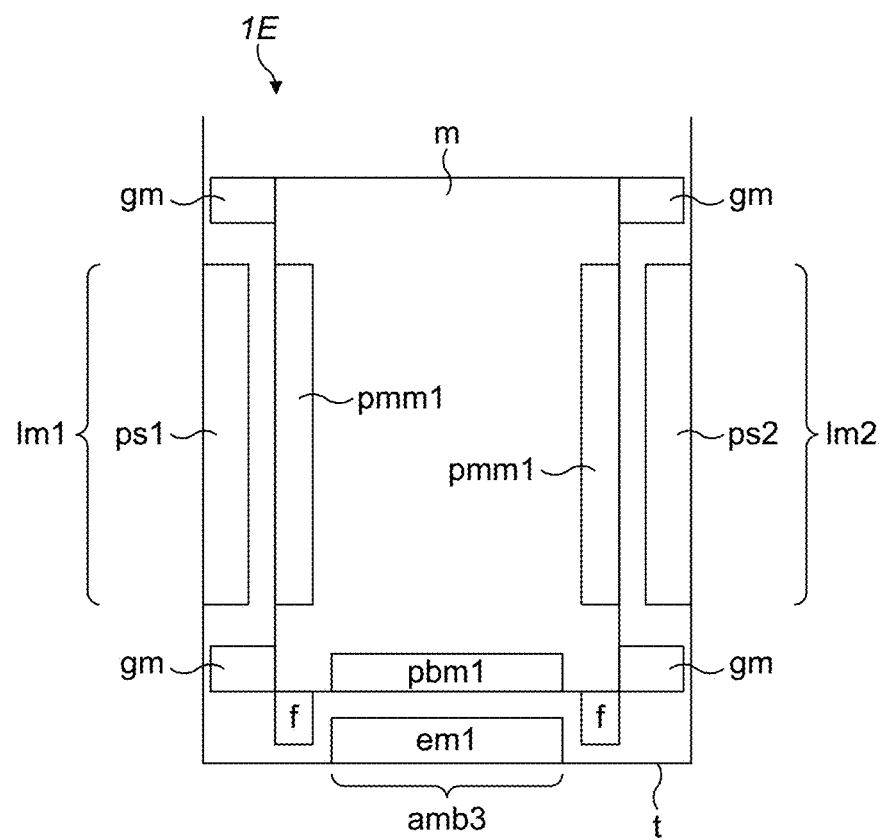

FIG. 14 is a schematic diagram of an alternative electric stabiliser 1E that is suitable if there is a reduced width constraint (i.e., along the Y axis). A single active magnetic bearing (labelled "amb1") is located below the mover m. A first planar stator (labelled "ps1") is positioned at the first side of the mover m and includes a first polyphase stator winding. A second planar stator (labelled "ps2") is positioned at the second side of the mover m and includes a second polyphase stator winding. The mover m includes a first plurality of permanent motor magnets (labelled "pmm1") facing the first polyphase stator winding that define a first plurality of mover poles of alternating polarity (i.e., north and south polarity) along its longitudinal axis. The mover m includes a second plurality of permanent motor magnets (labelled "pmm2") facing the second polyphase stator winding that define a second plurality of mover poles of alternating polarity (i.e., north and south polarity) along its longitudinal axis. The first planar stator and the first plurality of permanent motor magnets define a first part of the DC linear motor (labelled "lm1") and the second planar stator, and the second plurality of permanent motor magnets define a second part of the DC linear motor (labelled "lm2")

When the electromagnets are not energised, the braking force $F_{brake}$ acting on the mover m can be given as:

$$F_{brake} = F_{amb1\_brake} + M \cdot g$$

When the electromagnets are energised and the mover m is levitated above the track t, the force acting on the mover can be given as:

$$-F_{amb1\_lev} = M \cdot g$$

The main body of the mover shown in FIGS. 1 to 9B, has an integral or single-piece construction. However, limited access can sometimes prevent a physically large main body having an integral or single-piece construction from being easily installed in the marine vessel or other floating structure.

In an alternative arrangement shown in FIGS. 15 to 21, the mover 64 is formed from a plurality of individual modules or units 66a, 66b, . . . that are connected together. Such a mover has an articulated construction—i.e., where the modules or units 66a, 66b, . . . can move or pivot relative to each other—and can be used with the track shown in FIGS. 1 and 2 and with the planar stator 10 that includes a polyphase stator winding 16.

Figure 15:
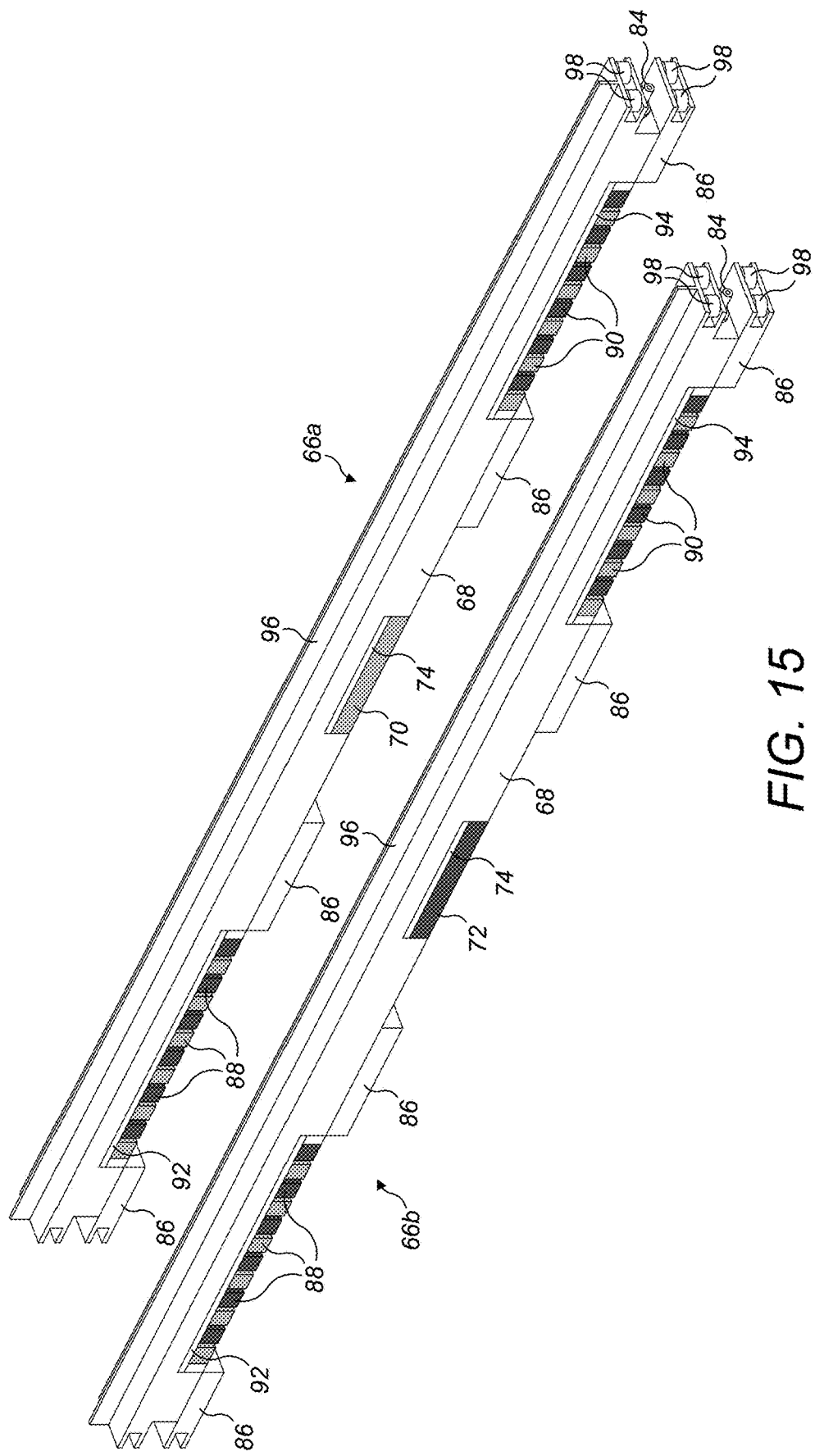
FIG. 15 is a perspective view of two modules or units of an articulated mover.
Figure 16:
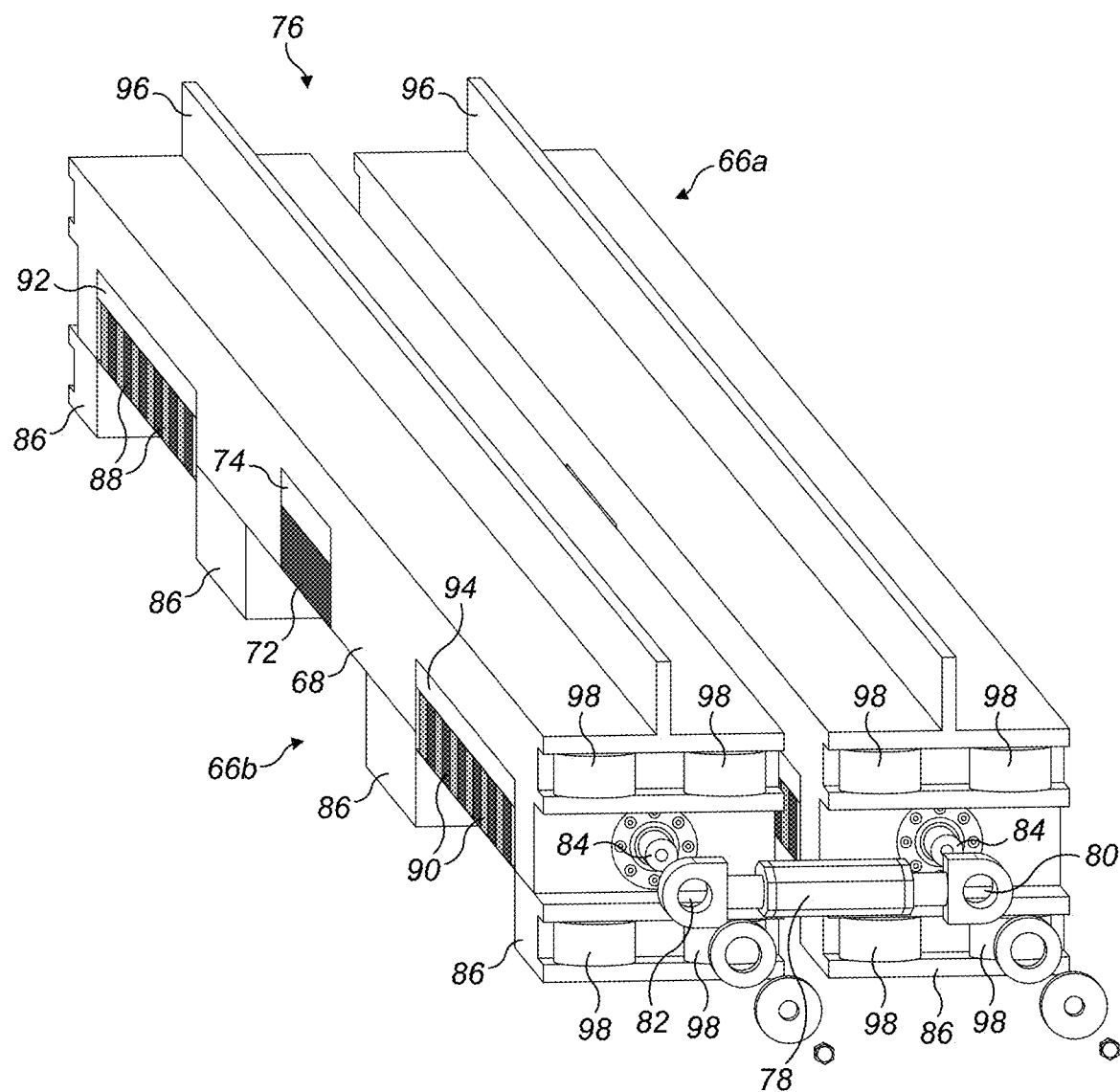
FIG. 16 is a perspective view of two modules or units of an articulated mover.
Figure 17A:
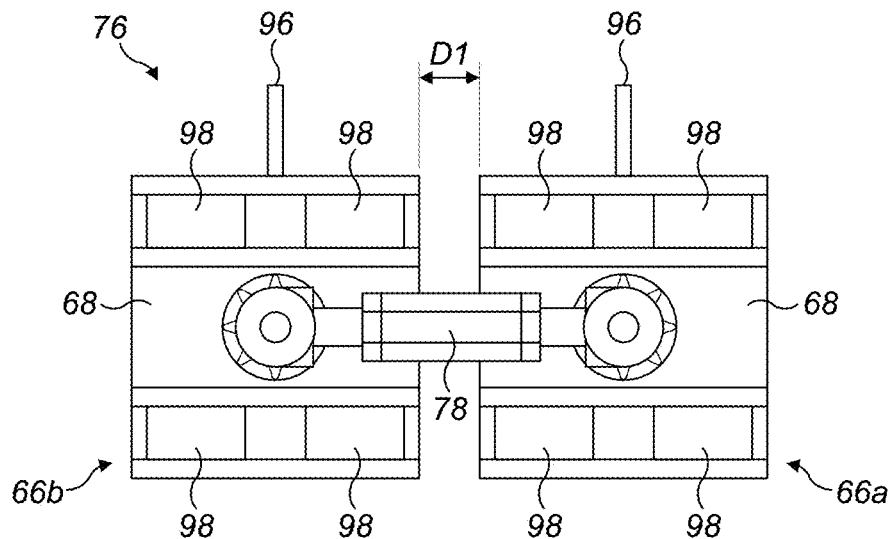
FIGS. 17A and 17B are side views of two connected modules or units of an articulated mover.
Figure 17B:
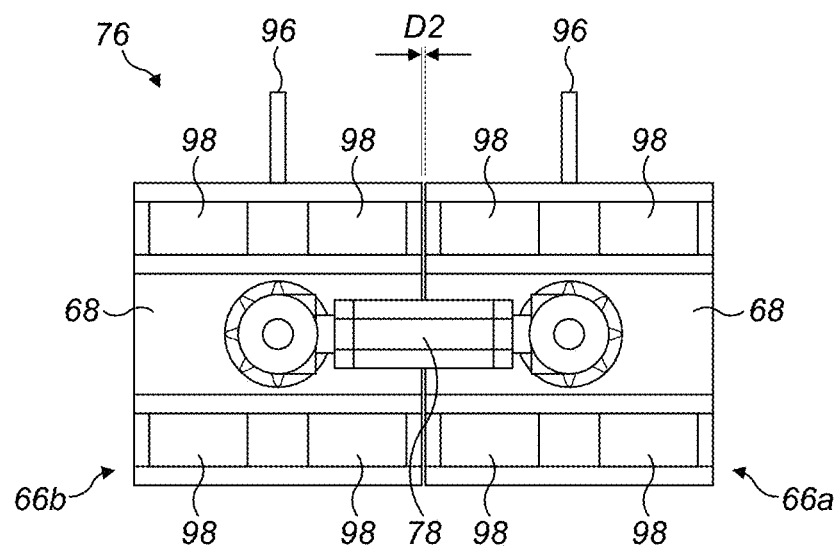
Figure 18:
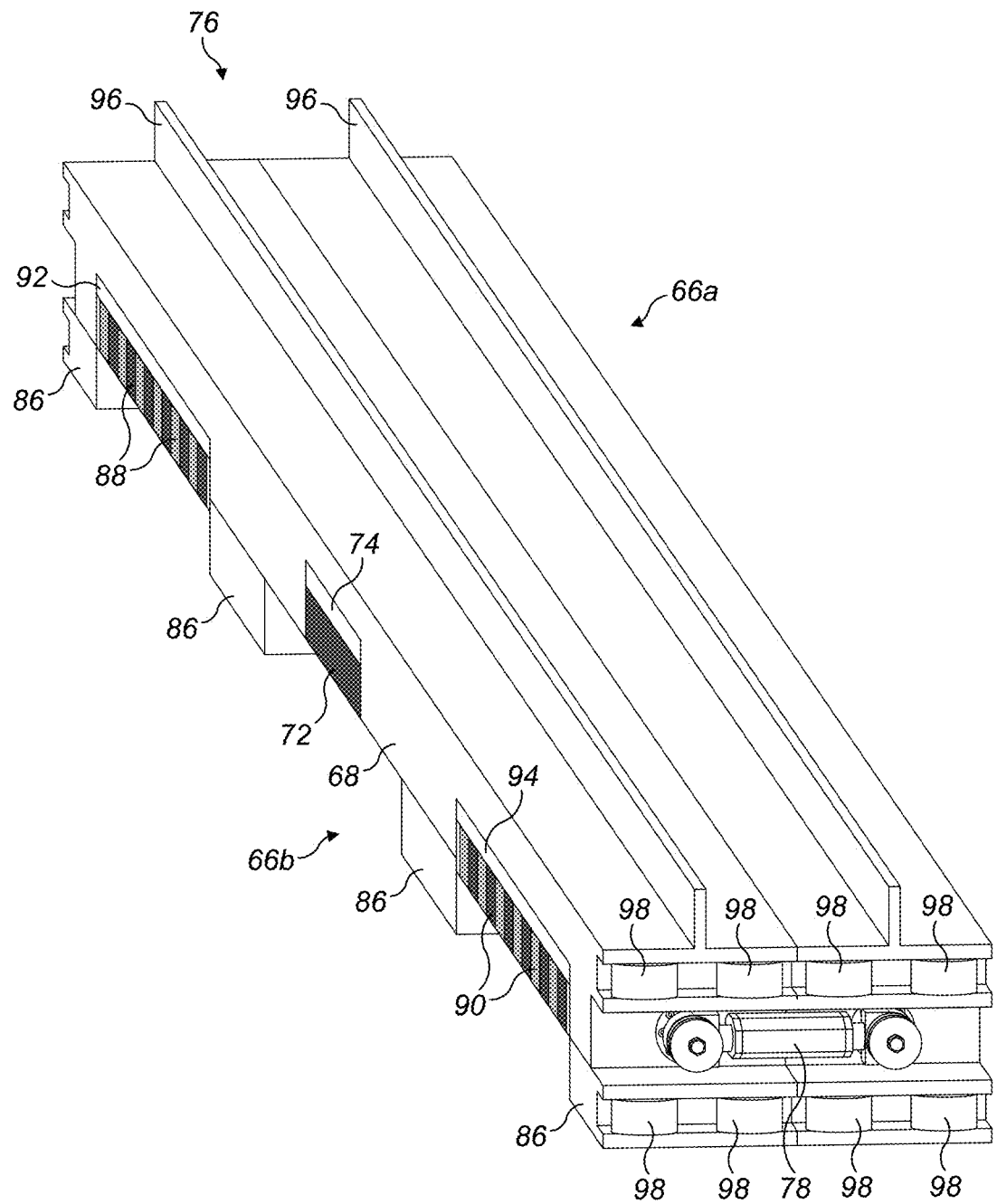
FIG. 18 is a perspective view of a "pole pair" of an articulated mover.

FIG. 15 shows two modules or units 66a, 66b of the articulated mover 64. Each module or unit 66a, 66b includes a main body 68. Facing the planar stator 10, each module or unit 66a, 66b includes one or more permanent motor magnets defining a mover pole having a particular polarity (e.g., north polarity or south polarity). In particular, FIG. 15 shows a first module or unit 66a with a permanent motor magnet 70 defining a mover pole having north polarity and a second module or unit 66b with a permanent motor magnet 72 defining a mover pole having south polarity. Each permanent motor magnet 70, 72 is mounted on a motor mount 74 that is formed in a recess in the centre of the lower surface of each module or unit 66a, 66b. The individual modules or units are connected together so as to define mover poles of alternating polarity along the track direction. In FIGS. 17A, 17B and 18 the first module or unit 66a is shown connected to the second module or unit 66b to define a "mover pole pair" 76.

The first and second modules or units 66a, 66b that define a mover pole pair 76 are connected together by connecting rods 78. More particularly, each connecting rod 78 includes a first opening 80 at a first axial end and a second opening 82 at a second axial end. Each side of each module or unit 66a, 66b includes a protrusion 84. (Although only one protrusion is shown on the near side of each module or unit, it will be understood that an identical protrusion is provided on the far side of each module or unit.) A first connecting rod 78 is positioned at one side of the first and second modules or units 66a, 66b and the first opening 80 receives a protrusion 84 of the first module or unit 66a and the second opening 82 receives a protrusion 84 of the second module or unit 66b. A second connecting rod (not shown) is positioned at the other side of the first and second modules or units and the first opening receives a protrusion of the first module or unit, and the second opening receives a protrusion of the second module or unit. The first and second modules or units 66a, 66b are pivotally connected to the connecting rods 78.

As shown in FIGS. 17A and 17B, the length of each connecting rod 78 can be adjusted so as to adjust the lateral spacing between the pair of adjacent modules or units. FIG. 17A shows an initial position immediately after the connecting rods 78 are connected to the first and second modules or units 66a, 66b, which are spaced apart by a first distance D1. The connecting rods 78 are then shortened so that the first and second modules or units 66a, 66b are only spaced apart by a second distance D2, which is less than the first distance D1. The second distance D2 is sufficient to permit relative movement between the first and second modules or units 66a, 66b, for example as the mover 64 moves forwards or backwards along the track 2. A flexible insulating member (not shown) can be positioned between each adjacent pair of modules or units as long as it does not prevent them from being able to move or pivot relative to each other by the amount required.

Each module or unit 66a, 66b includes four non-magnetic feet 86 on a lower surface. The feet 86 are spaced apart along the main body 68.

Each module or unit 66a, 66b also includes a first plurality of permanent bearing magnets 88 and a second plurality of permanent bearing magnets 90 on a lower surface. The first plurality of permanent bearing magnets 88 define a plurality of bearing poles of alternating first and second polarity (e.g., north and south polarity) along the transverse axis of the module or unit 66a, 66b. The second plurality of permanent bearing magnets 90 define a plurality of bearing poles of alternating first and second polarity (e.g., north and south polarity) along the transverse axis of the module or unit 66a, 66b. More particularly, the first plurality of permanent bearing magnets 88 defines six bearing poles of north polarity and six bearing poles of south polarity, and the second plurality of permanent bearing magnets 90 defines six bearing poles of north polarity and six bearing poles of south polarity.

The permanent bearing magnets 88, 90 are mounted on two bearing mounts 92, 94 that are formed in a respective recess in the lower surface of each module or unit 66a, 66b.

Each module or unit 66a, 66b includes an upwardly extending flange 96 for increasing its rigidity. The flange 96 is formed on, and extends along, the upper surface of the main body 68.

Both sides of each module or unit 66a, 66b include a plurality of rollers 98 as guide members adapted to contact the facing side of the track 2 to guide and locate the module or unit as it moves forwards and backwards along the track. The rollers 98 are arranged in two rows—i.e., an upper row and a lower row.

The first and second modules or units 66a, 66b defining a mover pole pair 76 can be selectively driven forwards or backwards along the track 2 by the bidirectional linear driving force (or "thrust") that is generated by the interaction between the magnetic field produced by the switched DC current in each polyphase stator winding and the magnetic field produced by the facing pair of permanent motor magnets 72, 74. A mover pole pair 76 represents the minimum construction for a practical mover.

Figure 19A:
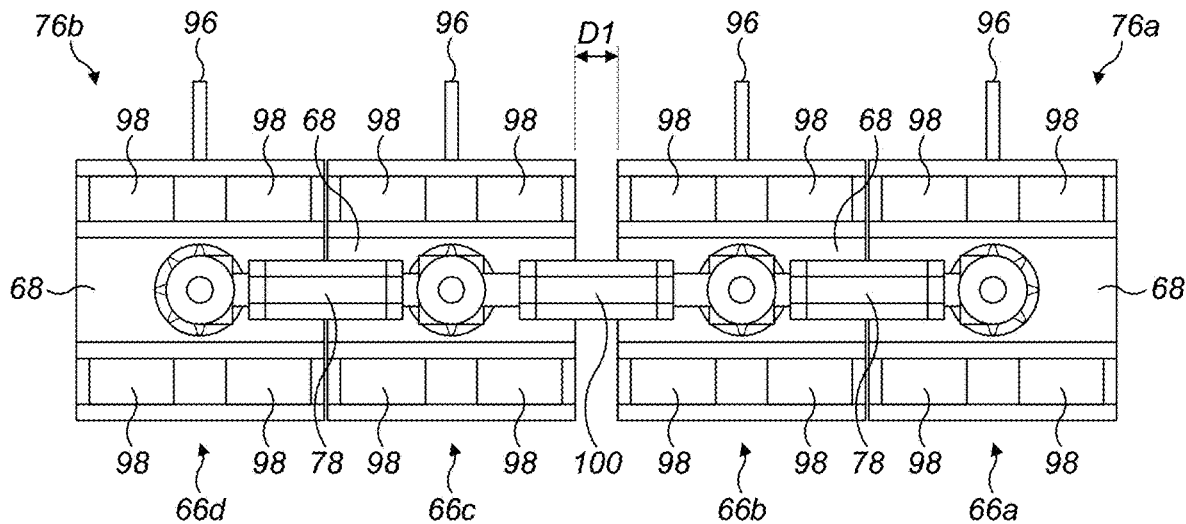
FIGS. 19A and 19B are side views of two connected "pole pairs" of an articulated mover.
Figure 19B:
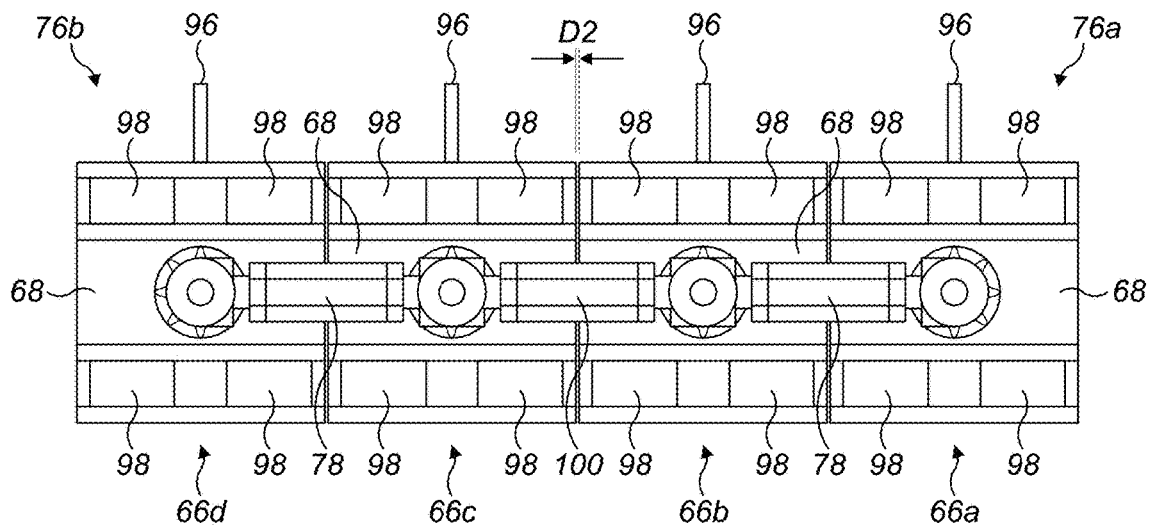
Figure 20:
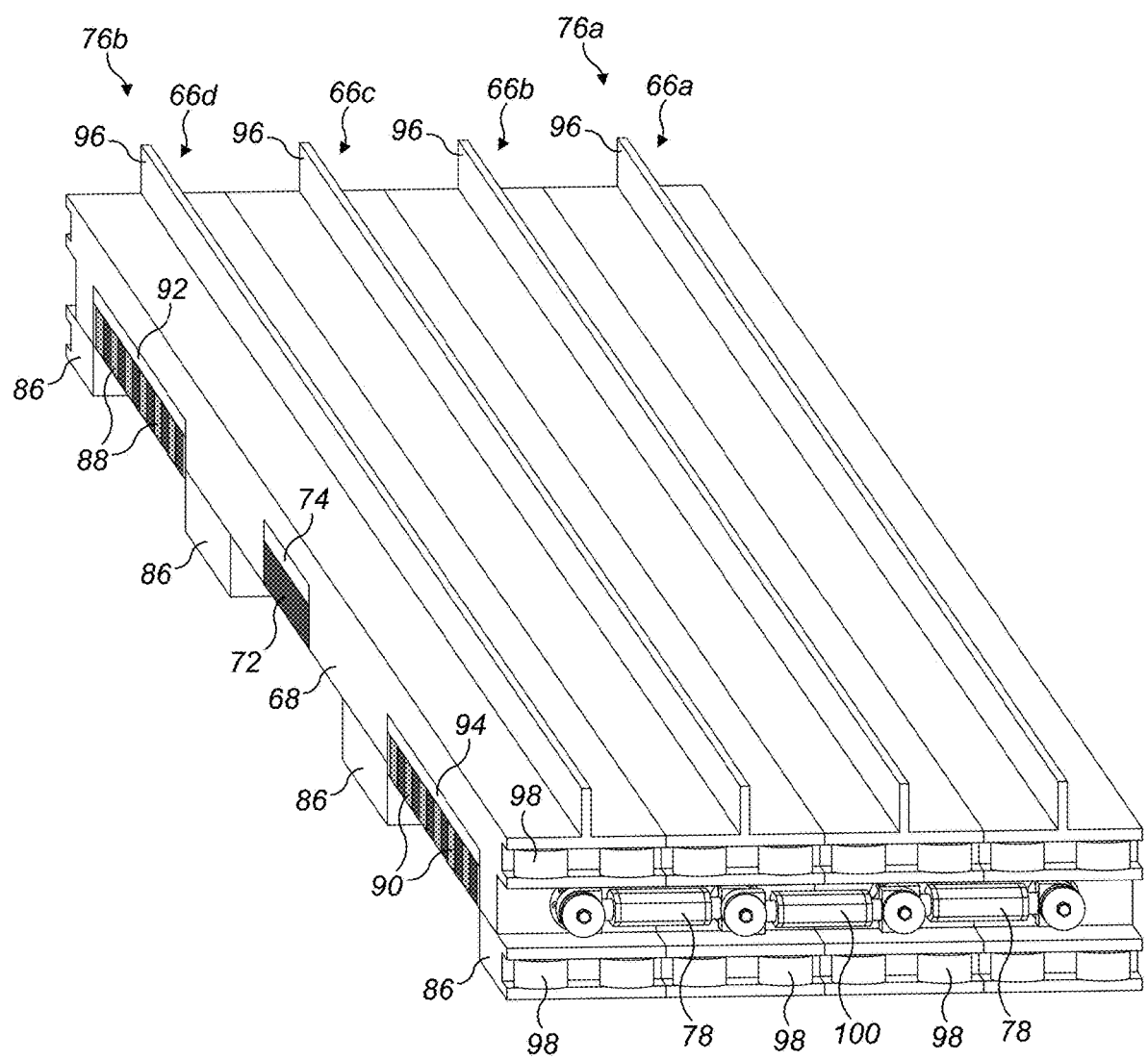
FIG. 20 is a perspective view of the two connected "pole pairs" of FIGS. 19A and 19B.

FIGS. 19A, 19B and 20 show how the first and second modules or units 66a, 66b that define a first mover pole pair 76a are connected to third and fourth modules or units 66c, 66d that define a second mover pole pair 76b by a pair of connecting rods 100 in the same way as the individual modules or units. In particular, the length of each connecting rod 100 can be adjusted so as to adjust the lateral spacing between the pair of adjacent mover pole pairs. FIG. 19A shows an initial position immediately after the connecting rods 100 are connected to the second and third modules or units 66b, 66c, which are spaced apart by a first distance D1. The connecting rods 100 are then shortened so that the second and third modules or units 66b, 66c are only spaced apart by a second distance D2, which is less than the first distance D1. The second distance D2 is sufficient to permit relative movement between the second and third modules or units 66b, 66c as required, for example as the mover 64 moves forwards or backwards along the track 2.

In this way, an articulated mover 64 can be constructed from a suitable number of modules or units. Each module or unit 66a, 66b, . . . has substantially the same construction and can be manufactured as a "standard" module or unit, so that movers of different lengths can be constructed by selecting the required number of modules or units (or mover pole pairs) and connecting them together as described above. Each additional module or unit will increase the mass of the mover. This allows movers of different mass to be constructed from a plurality of "standard" modules or units for use with a "standard" width track.

Figure 21:
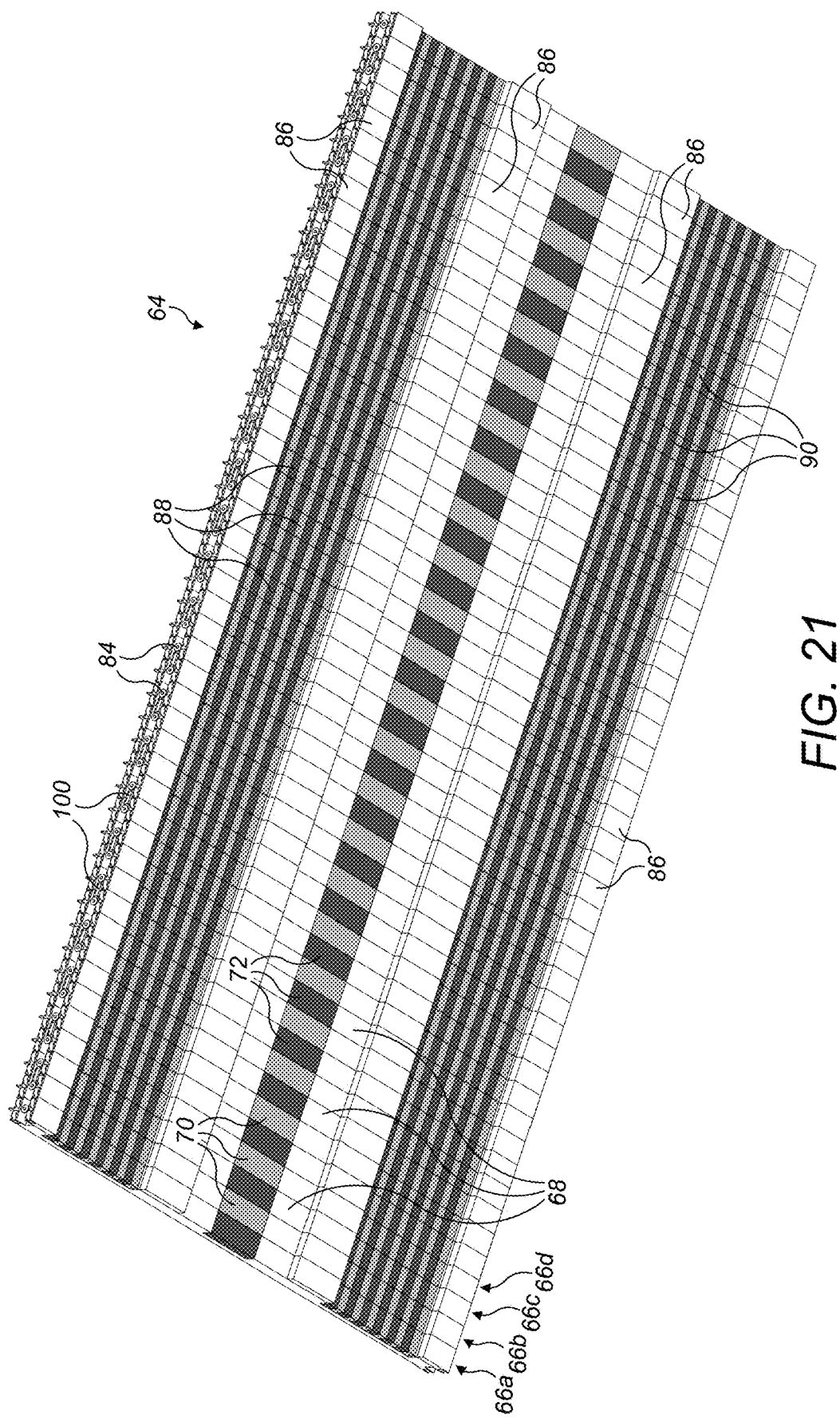
FIG. 21 is a lower perspective view of an articulated mover according to the present invention.

FIG. 21 shows the underside of an articulated mover 64 with a plurality of modules or units connected tougher by connecting rods. It is clear from FIG. 21 how the permanent motor magnets 70, 72 define a plurality of mover poles of alternating polarity (i.e., north and south polarity) along the longitudinal axis of the articulated mover 64. FIG. 21 also shows how the bearing poles defined by the first and second plurality of permanent bearing magnets 88, 90 of each module or unit extend along the longitudinal axis of the mover 64.

Figure 22:
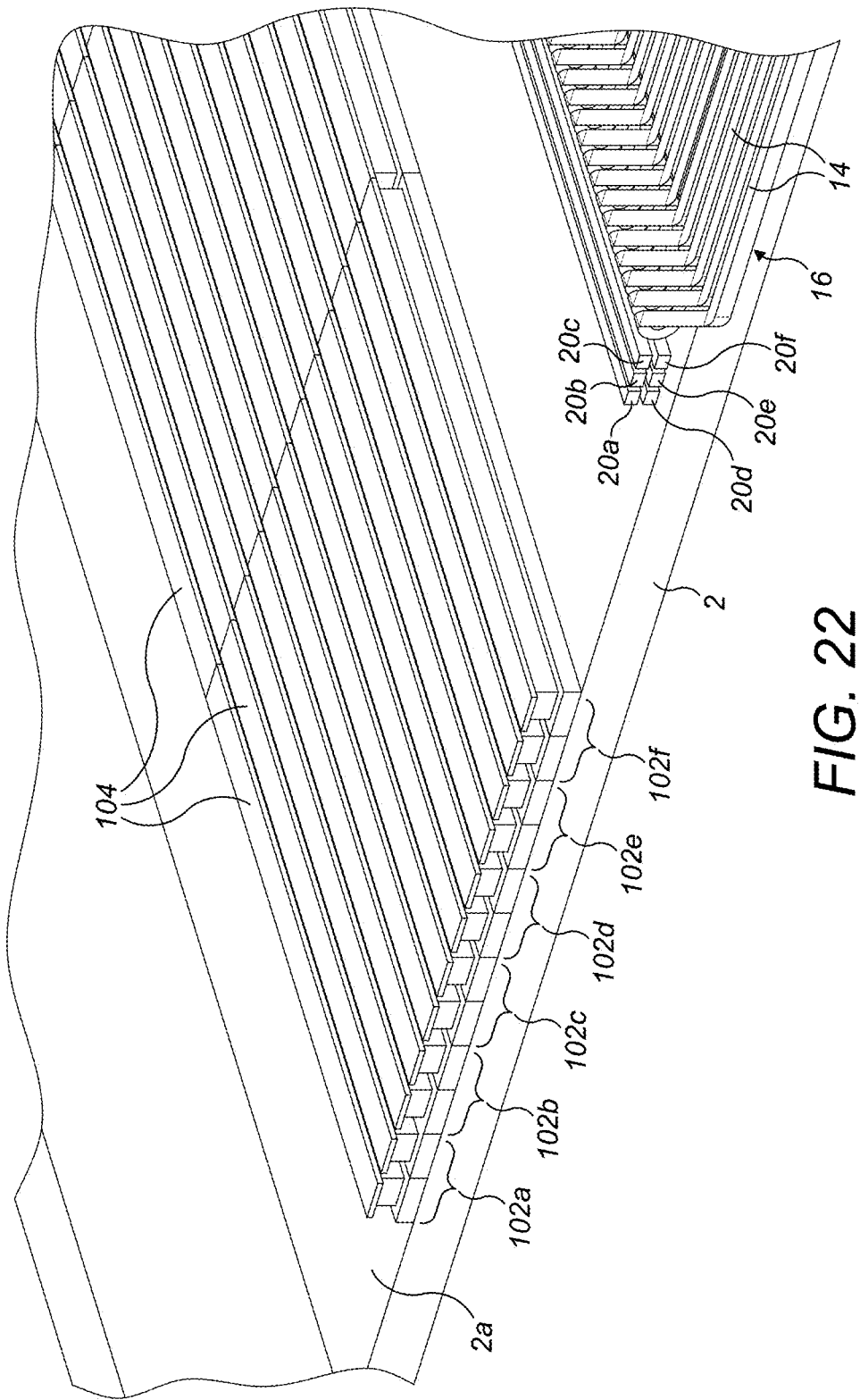
FIG. 22 is a detail view of electromagnets.
Figure 23:
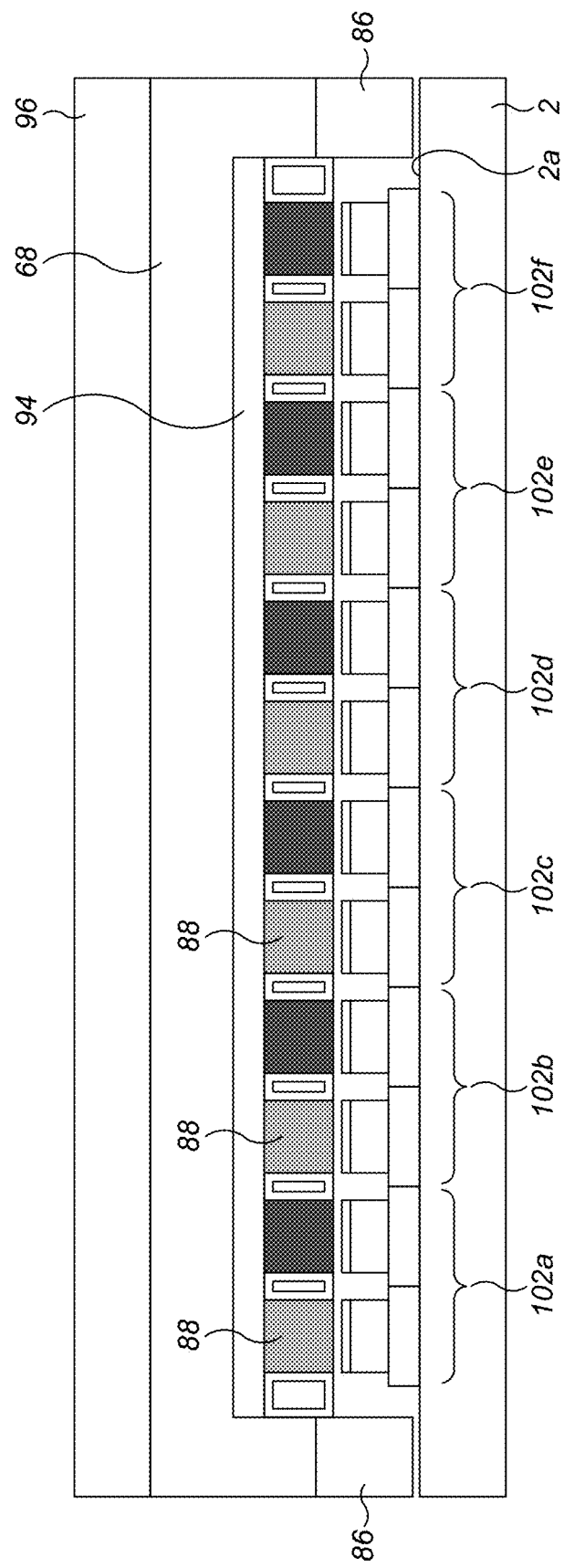
FIG. 23 is a cross-section view of an active magnetic bearing with the electromagnet of FIG. 22.
Figure 24:
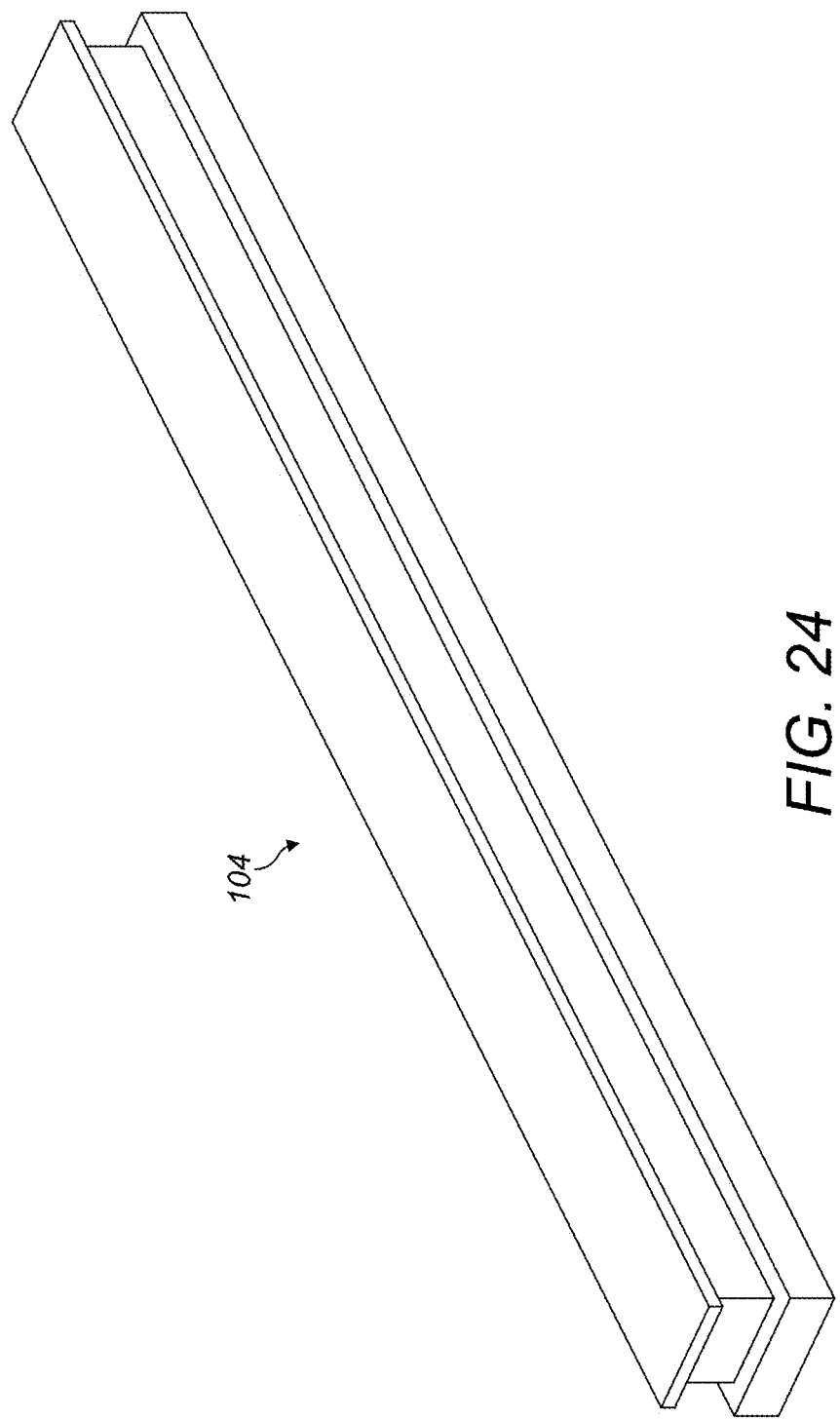
FIG. 24 is a module or unit for an electromagnet.

As shown in FIGS. 22 to 24, the first plurality of permanent bearing magnets 88 are positioned opposite six pairs of electromagnets 102a, 102b, . . . , 102f arranged across the base of the track. Each electromagnet has a modular construction—i.e., it is constructed from a plurality of modules or units 104 that are assembled together along the track—see FIG. 24 in particular. The second plurality of permanent bearing magnets 90 are also arranged opposite six pairs of electromagnets arranged across the base of the track. A similar arrangement of permanent bearing magnets defining a plurality of bearing poles of alternating polarity and a plurality of pairs of electromagnets can also be used with the electric stabiliser shown in FIGS. 1 to 9B.

Figure 25:
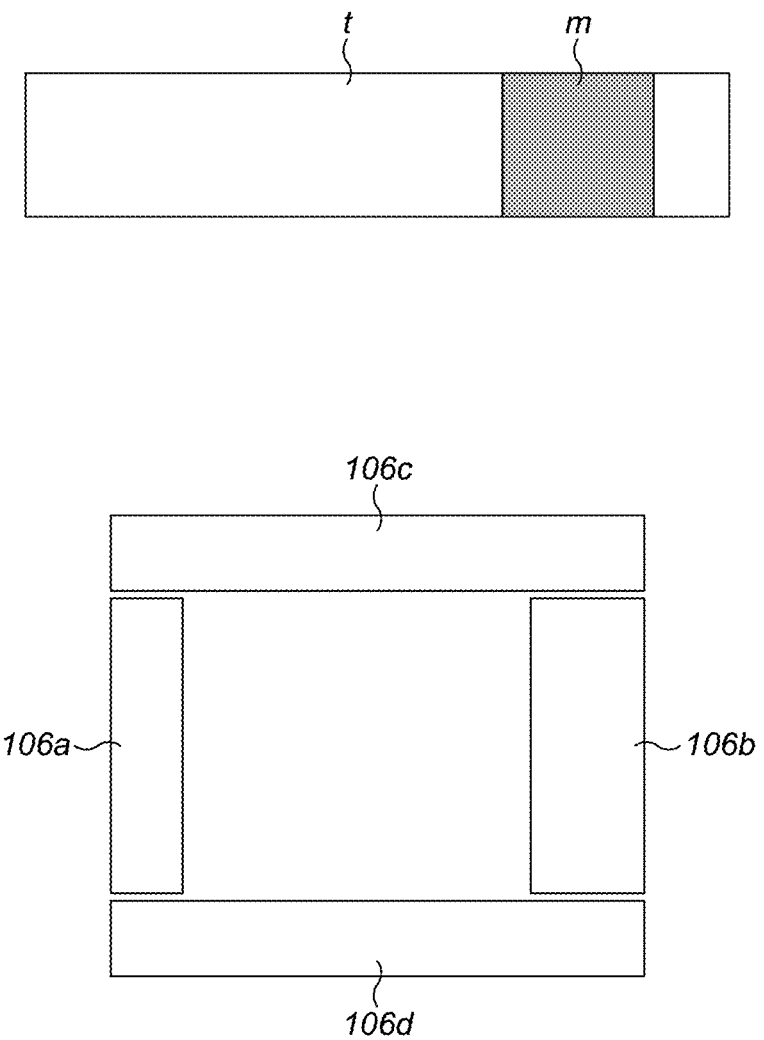
FIG. 25 is a horizontal track layout of a linear electric stabiliser.

The track 2 described above has a straight horizontal track layout—see FIG. 25 where the track is labelled "t" and the mover is labelled "m". But the track can also have a circular horizontal track layout. If the track is circular, the mover will be shaped to allow it to move along the track and will have sides that are curved—see FIG. 26 where the track is labelled "t" and the mover is labelled "m". If the track is circular, driving the mover forwards along the track can correspond to driving the mover in a clockwise direction and driving the mover backwards along the track can correspond to driving the mover in an anti-clockwise direction, for example.

FIG. 25 shows how four electric stabilisers 106a, 106b, . . . , 106d with straight tracks can be used in combination to dampen rotation about two perpendicular axes of the marine vessel. More particularly, two electric stabilisers 106a, 106b are arranged in parallel along the transverse or port-starboard axis of the marine vessel and can be used as anti-roll stabilisers to dampen rotation of the marine vessel about the longitudinal or bow-stern axis. Two electric stabilisers 106c, 106d are arranged in parallel along the longitudinal or bow-stern axis of the marine vessel and can be used as anti-pitch stabilisers to dampen rotation of the marine vessel about the transverse or port-starboard axis of the marine vessel. As shown in FIG. 25 the electric stabilisers do not have to be identical—they can have different track widths and different track lengths, for example, and can be configured to provide different damping along the different axes.

Figure 26:
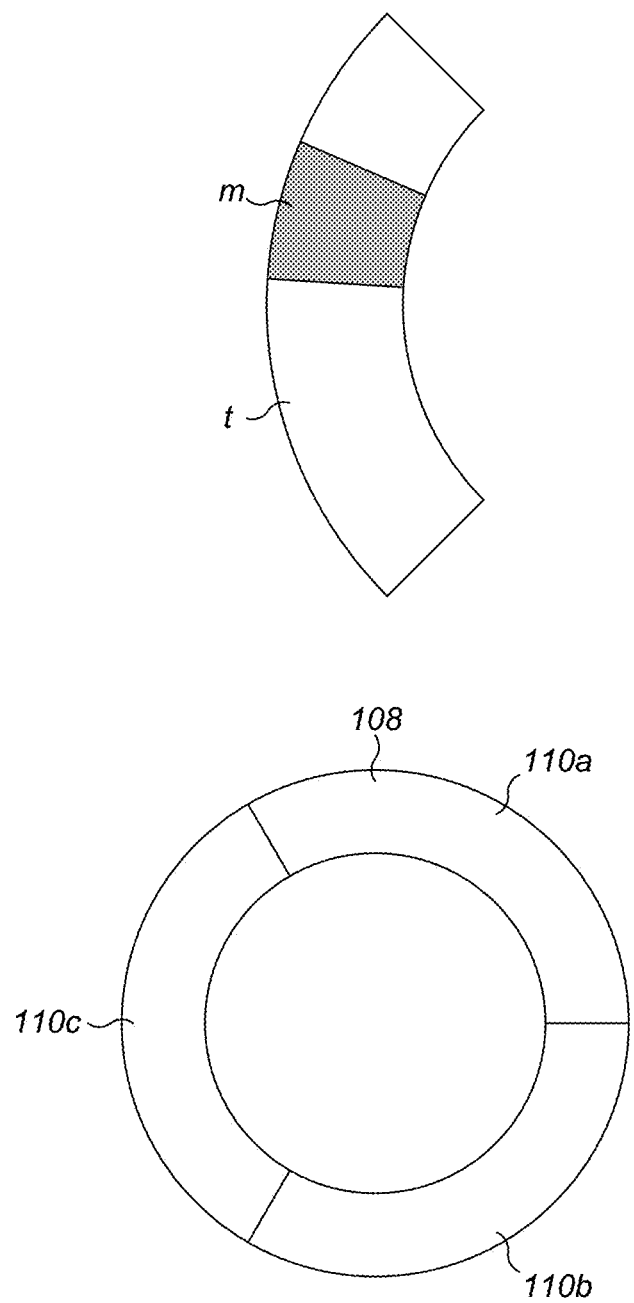
FIG. 26 is a horizontal track layout of a circular electric stabiliser.
Figure 27:
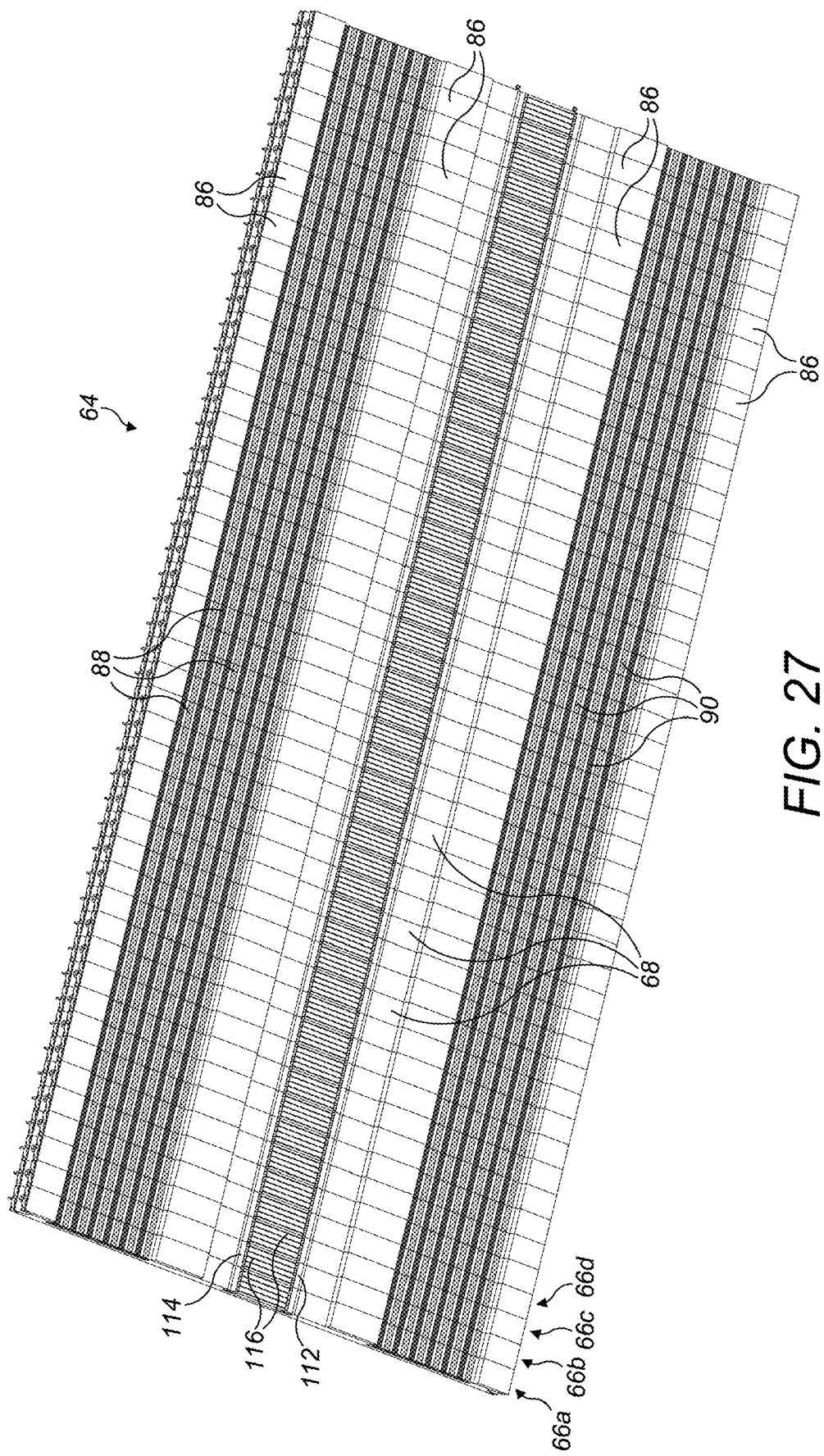
FIG. 27 is a lower perspective view of an articulated mover according to the present invention where the DC linear motor is an induction motor with a "squirrel-cage" construction.

FIG. 26 shows an electric stabiliser 108 with a circular track that can be constructed in a plurality of curved sections 110a, 110b and 110c.

In an alternative arrangement of the electric stabiliser shown in FIGS. 27 to 34, the DC linear motor is an induction motor with a "squirrel-cage" construction. The squirrel-cage construction is applied to the articulated mover 64 shown in FIGS. 15 to 21 and like parts have been given the same reference sign. It will be readily understood from FIG. 27, which corresponds generally to FIG. 21 described above, that the permanent motor magnets 70, 72 of the synchronous motor are replaced with a pair of electrically conductive short-circuit bars 112, 114 that are spaced apart along the transverse axis of the mover 64 and a plurality of electrically conductive conductor bars 116 that extend in parallel between the short-circuit bars 112, 114 and are spaced apart along the longitudinal axis of the mover 64. The conductor bars 116 are received in a plurality of openings formed in a mount or core 122 of each module or unit. The short-circuit bars 112, 114 and the conducting bars 116 can be formed of aluminium or copper, for example. The conducting bars 116 are partially exposed at a lower surface of the mount 122 and face the planar stator.

Figure 28:
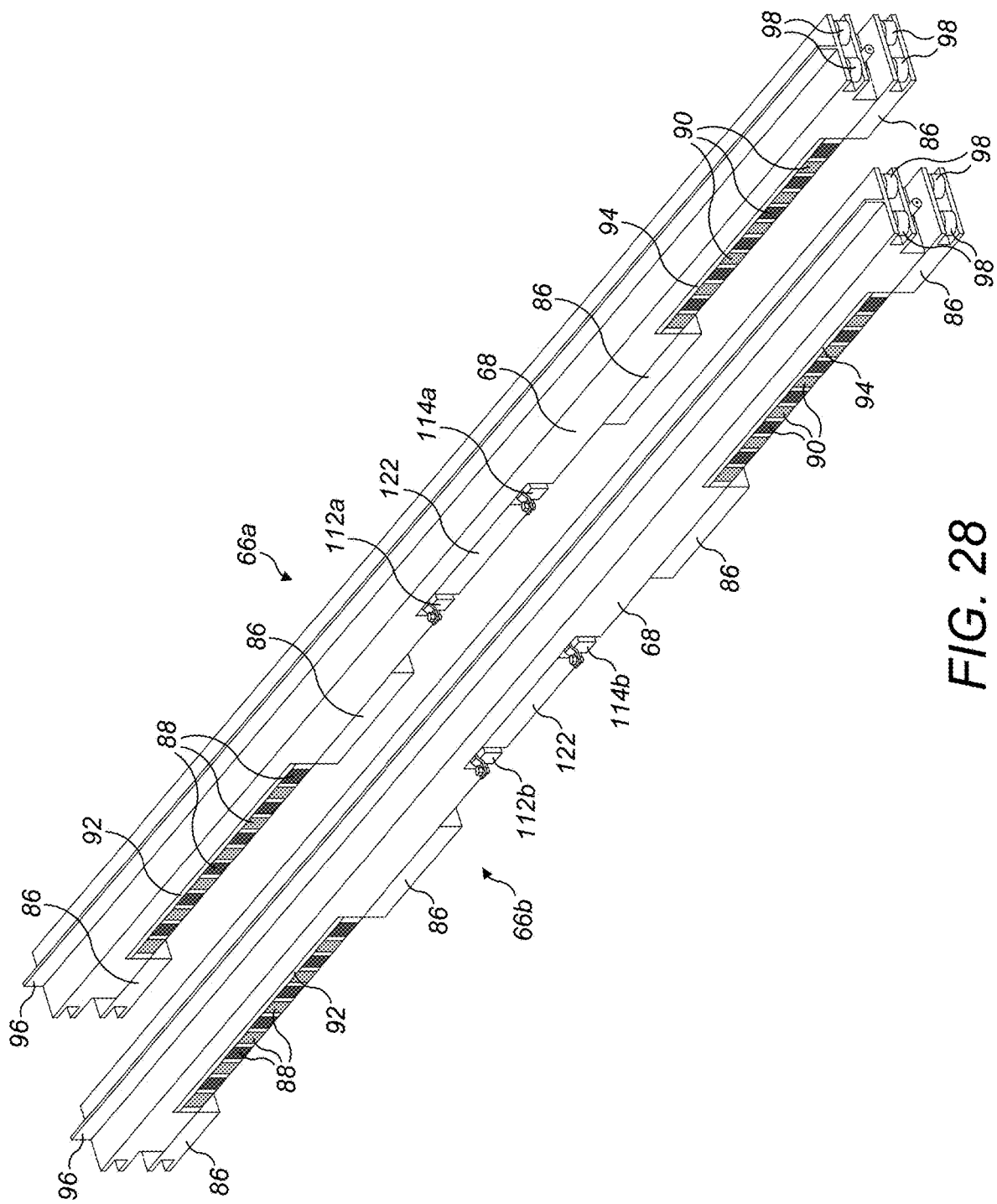
FIG. 28 is an upper perspective view of two modules or units of the articulated mover of FIG. 27.
Figure 29:
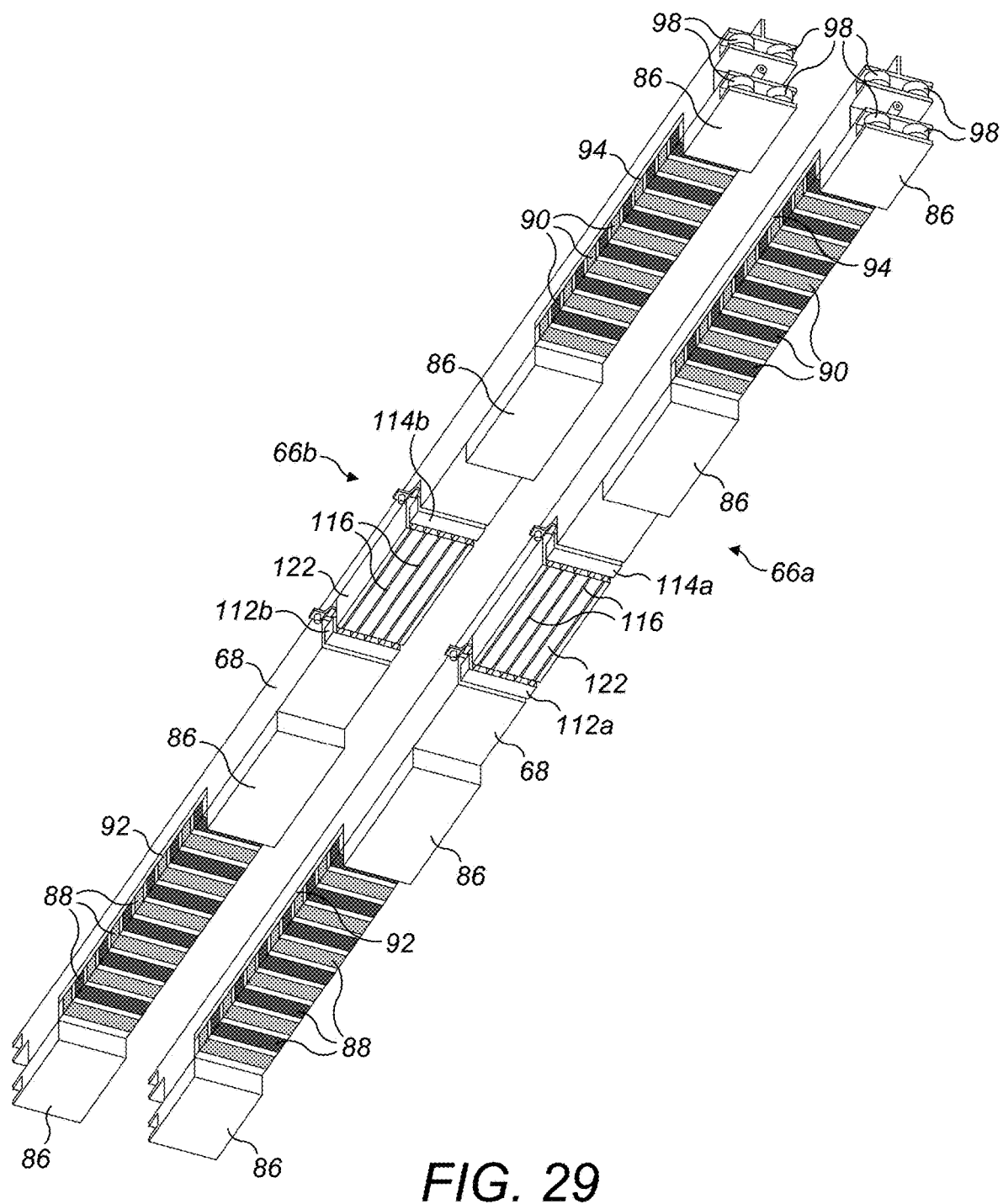
FIG. 29 is a lower perspective view of the two modules or units of FIG. 28.
Figure 30:
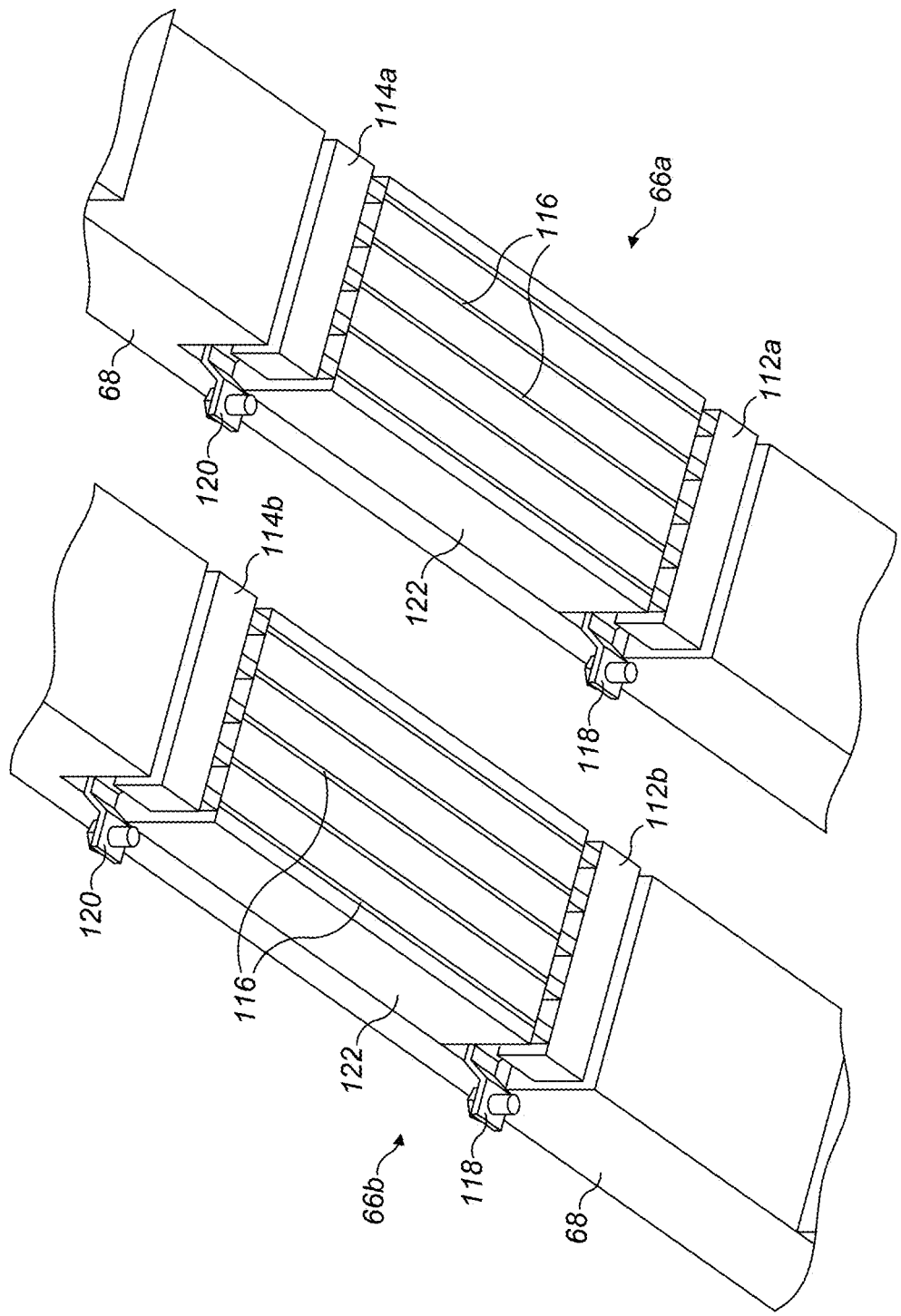
FIG. 30 is a detail view of the two modules or units of FIG. 29.
Figure 31:
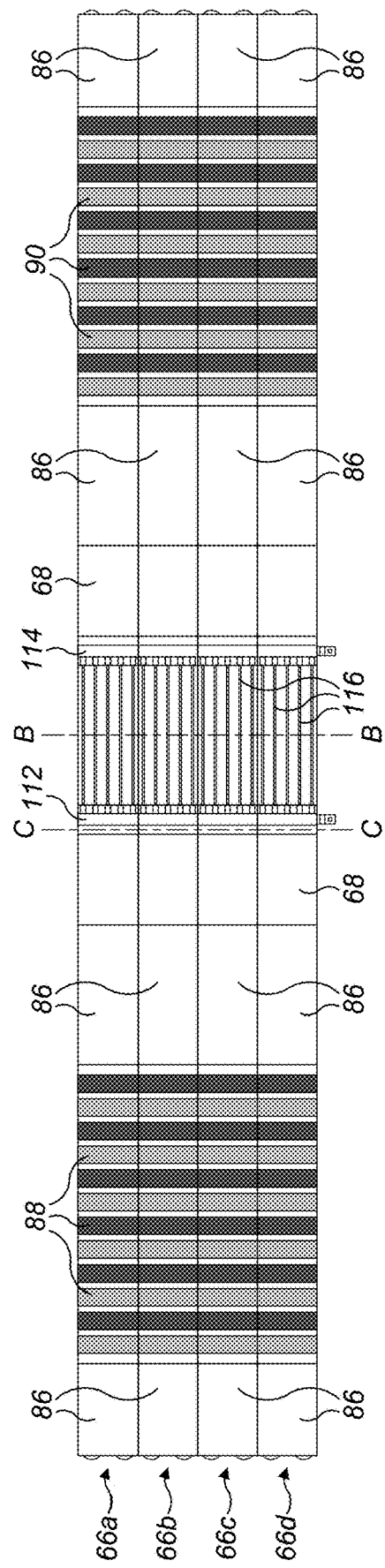
FIG. 31 is a lower view of four modules or units of the articulated mover of FIG. 27.
Figure 32:
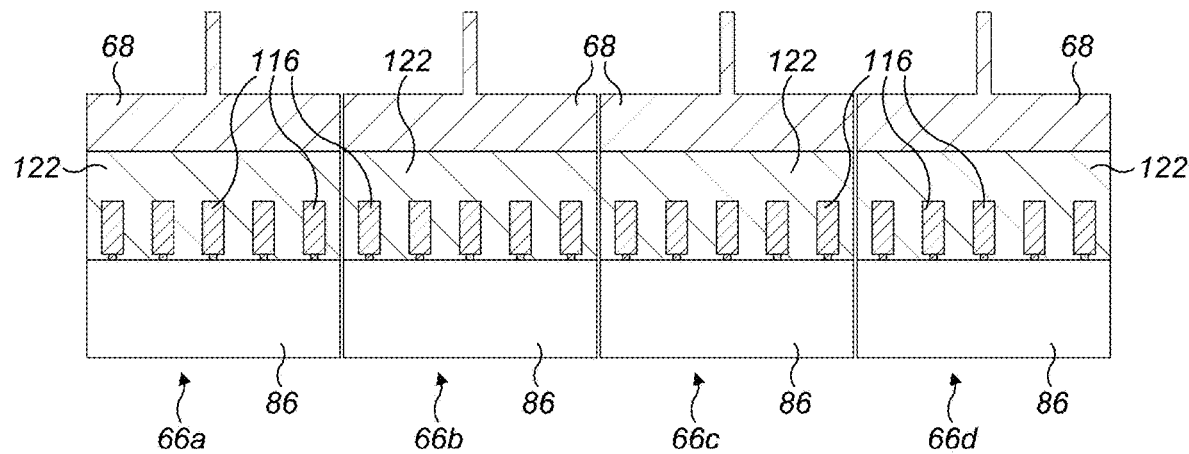
FIG. 32 is a cross-section view of the four modules or units of the articulated mover of FIG. 31 taken along line B-B.

A pair of modules or units 66a, 66b are shown in FIGS. 28 and 29. The short-circuit bar 112 is divided into a plurality of segments 112a, 112b, . . . , and the short-circuit bar 114 is divided into a plurality of segments 114a, 114b, . . . as shown. Each module or unit 66a, 66b includes a pair of segments. In particular, the module or unit 66a includes a pair of spaced segments 112a, 114a and the module or unit 66b includes a pair of spaced segments 112b, 114b as shown. Each module or unit 66a, 66b includes a plurality of conducting bars 116. Each module or unit 66a, 66b also includes a mount 122 for receiving the plurality of conducting bars 116 as described above. Each mount 122 comprises a plurality of thin sheets or laminations of magnetically permeable (preferably ferromagnetic) material, separated by electrically insulating layers, stacked in the transverse direction to minimise eddy current losses.

Figure 33:
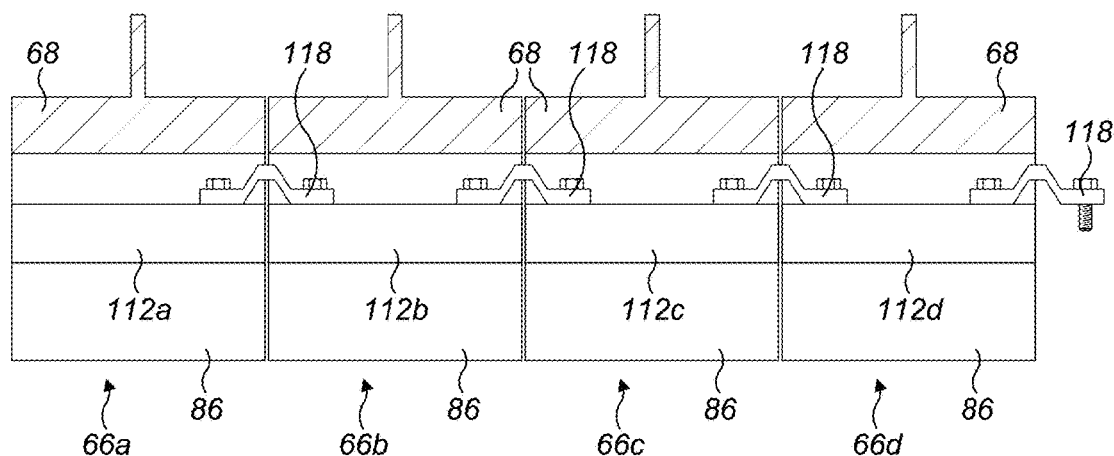
FIG. 33 is a cross-section view of the four modules or units of the articulated mover of FIG. 31 taken along line C-C.
Figure 34:
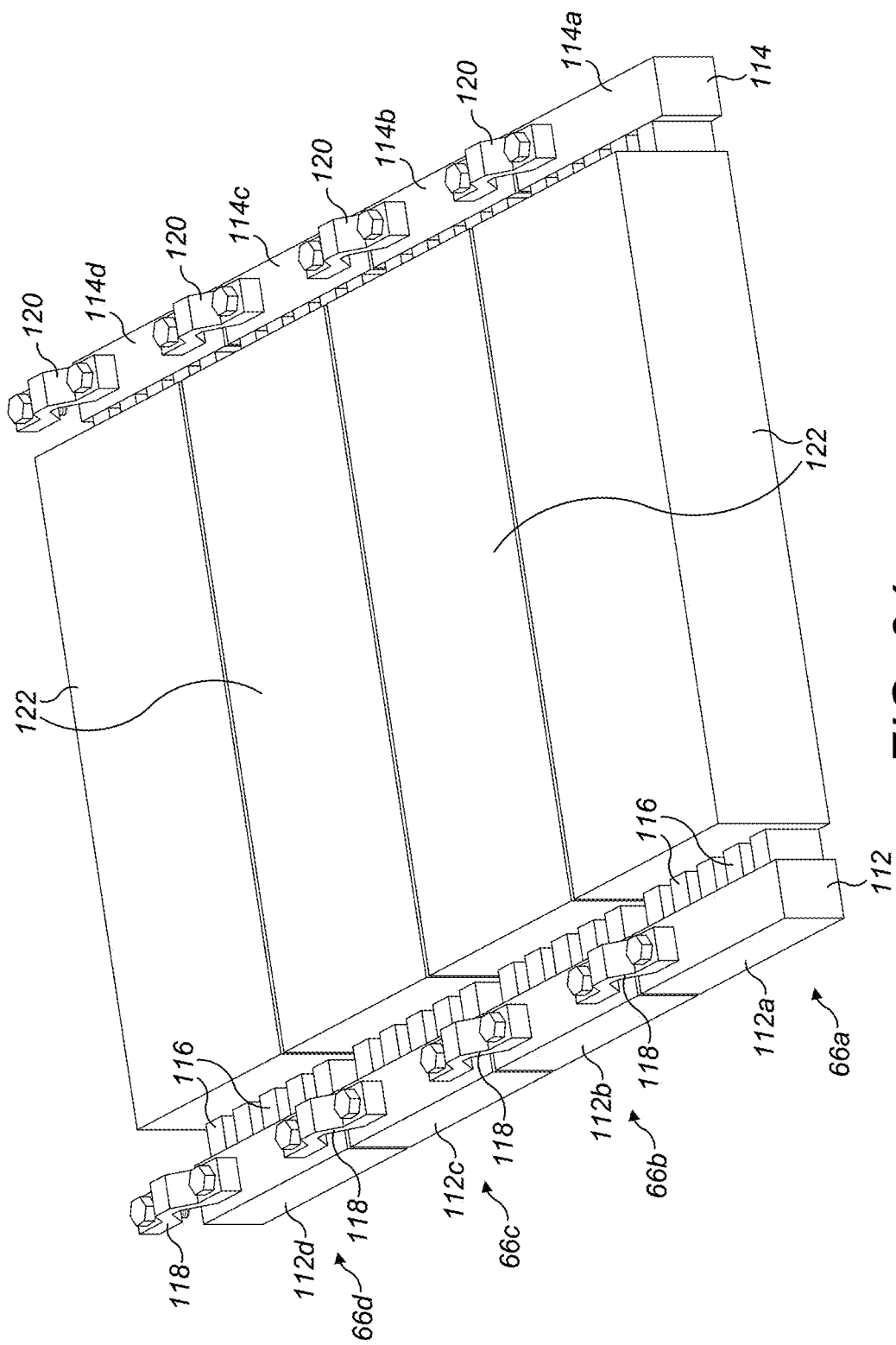
FIG. 34 is a detail upper perspective view of the four modules or units of the articulated mover shown in FIG. 31 showing the flexible connectors.

As shown more clearly in FIGS. 33 and 34, the segments 112a, 112b, . . . , are physically and electrically connected by electrically conductive flexible connectors 118. Similarly, the segments 114a, 114b, . . . , are physically and electrically connected by electrically conductive flexible connectors 120. Each flexible connector 118, 120 is connected between a pair of segments by mechanical fixings and allows the modules or units of the mover to move or pivot while maintaining electrical contact such that the segments 112a, 112b, . . . together define a single short-circuit bar 112 and the segments 114a, 114b, . . . together define a single-short circuit bar 114. It will be readily understood that if the mover is not articulated, the short-circuit bars can instead have a single-piece construction.

In use, the mover 64 shown in FIGS. 27 to 34 is positioned in the channel 4 of the track 2 described above and is adapted to move forwards and backwards along the track as a stabiliser mass. In particular, the conducting bars 116 face the planar stator 10 that is mounted centrally on the base of the track 2. The mover can be driven forwards or backwards along the track 2 by the DC linear motor as described in more detail above.

The invention claimed is:

1. An electric stabiliser for stabilising a floating structure, the electric stabiliser comprising:
   a track for guiding a moving stabiliser mass along a track direction;
   a direct current DC linear motor comprising a planar stator that extends along the track, and a mover that is adapted to move forwards and backwards along the track as the stabiliser mass, wherein the planar stator comprises a polyphase stator winding, and the mover comprises (i) a plurality of permanent motor magnets facing the polyphase stator winding that define a plurality of mover poles of alternating polarity along the track direction; and (ii) in a lower part of the mover, a first plurality of permanent bearing magnets defining a first bearing pole of first polarity extending along the longitudinal axis of the mover and a second plurality of permanent bearing magnets defining a second bearing pole of second and opposite polarity extending along the longitudinal axis of the mover; and
   at least one active magnetic bearing for selectively levitating the mover.

2. The electric stabiliser according to claim 1, wherein the track has a base and a pair of opposing sides that define a channel in which the mover is positioned, and wherein both sides of the mover further comprise one or more guide members adapted to contact the facing side of the track to guide and locate the mover as it moves forwards and backwards along the track.

3. The electric stabiliser according to claim 1, wherein the DC linear motor further comprises one or more additional planar stators, each planar stator comprising a polyphase stator winding, and wherein the mover further comprises one or more additional plurality of permanent motor magnets that define an additional plurality of mover poles of alternating polarity along the track direction, each additional plurality of permanent motor magnets facing a respective polyphase stator winding.

4. The electric stabiliser according to claim 1, wherein each polyphase stator winding comprises a plurality of phase windings, each phase winding defining a phase of the polyphase stator winding and comprising one or more winding coils that are received in winding slots of the respective planar stator.

5. The electric stabiliser according to claim 1, wherein the mover further comprises one or more motor mounts for mounting the permanent motor magnets, each motor mount comprising a plurality of thin sheets or laminations of magnetically permeable material, separated by electrically insulating layers, stacked along the transverse axis of the mover to define a planar mounting structure with a mounting surface on which the permanent motor magnets are mounted.

6. The electric stabiliser according to claim 1, wherein each planar stator is positioned:
   below the mover, with facing permanent motor magnets being provided on a lower part of the mover,
   above the mover with facing permanent motor magnets being provided on an upper part of the mover, or
   alongside the mover with facing permanent motor magnets being provided on a side part of the mover.

7. The electric stabiliser according to claim 1, wherein each active magnetic bearing comprises a pair of electromagnets and a plurality of permanent bearing magnets facing each electromagnet and formed on the lower part of the mover.

8. The electric stabiliser according to claim 7, wherein the first and second plurality of permanent bearing magnets are arranged side by side and optionally spaced apart along a transverse axis of the mover, and wherein the first plurality of permanent bearing magnets are arranged opposite one of the pair of electromagnets and the second plurality of permanent bearing magnets are arranged opposite the other of the pair of electromagnets.

9. The electric stabiliser according to claim 7, wherein the mover further comprises one or more bearing mounts for mounting the permanent bearing magnets, each bearing mount comprising a plurality of thin sheets or laminations of magnetically permeable material, separated by electrically insulating layers, stacked along the longitudinal axis of the mover to define a planar mounting structure with a mounting surface on which the permanent bearing magnets are mounted.

10. The electric stabiliser according to claim 9, wherein the mover further comprises one or more non-magnetic feet adapted to contact the track when the mover is not levitated by the at least one active magnetic bearing.

11. The electric stabiliser according to claim 10, wherein each non-magnetic foot is formed as a downwardly extending protrusion formed on a lower part of the mover.

12. The electric stabiliser according to claim 9, wherein the mover is formed from a plurality of individual modules or units that are connected together such that the mover has an articulated construction.

13. The electric stabiliser according to claim 12, wherein each module or unit comprises one or more permanent motor magnets defining one or more mover poles, each mover pole having a particular polarity, and wherein the individual modules or units are connected together so as to define mover poles of alternating polarity along the track direction.

14. The electric stabiliser according to claim 12, wherein the mover further comprises a plurality of connecting rods, wherein each connecting rod is pivotally connected to a pair of adjacent modules or units, and wherein the length of each connecting rod is adjustable so as to adjust the lateral spacing between the pair of adjacent modules or units.

15. A method of stabilising a floating structure using an electric stabiliser comprising:
   a track;
   a DC linear motor comprising a planar stator that extends along the track, and a mover comprising in its lower end, a first plurality of permanent bearing magnets defining a first bearing pole of first polarity extending along the longitudinal axis of the mover and a second plurality of permanent bearing magnets defining a second bearing pole of second and opposite polarity extending along the longitudinal axis of the mover; and
   at least one active magnetic bearing;
   the method comprising using the at least one active magnetic bearing to levitate the mover and controlling the DC linear motor to move the mover backwards and forwards along the track as a stabiliser mass.

* * * * *